US010520578B2

(12) United States Patent
Ivanov et al.

(10) Patent No.: US 10,520,578 B2
(45) Date of Patent: Dec. 31, 2019

(54) CHECKING FINGERPRINT SAMPLES FOR A RADIO MODEL

(71) Applicant: HERE GLOBAL B.V., Eindhoven (NL)

(72) Inventors: Pavel Ivanov, Tampere (FI); Jari Syrjärinne, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/764,620

(22) PCT Filed: Sep. 30, 2015

(86) PCT No.: PCT/EP2015/072505
§ 371 (c)(1),
(2) Date: Mar. 29, 2018

(87) PCT Pub. No.: WO2017/054853
PCT Pub. Date: Apr. 6, 2017

(65) Prior Publication Data
US 2019/0041488 A1    Feb. 7, 2019

(51) Int. Cl.
*G01S 5/02*    (2010.01)
*H04W 64/00*    (2009.01)
*H04W 4/33*    (2018.01)

(52) U.S. Cl.
CPC ............. *G01S 5/0252* (2013.01); *H04W 4/33* (2018.02); *H04W 64/00* (2013.01)

(58) Field of Classification Search
CPC ........ H04W 4/33; H04W 64/00; G01S 5/0252
See application file for complete search history.

(56) References Cited

U.S. PATENT DOCUMENTS 9,628,359 B1*    4/2017    Jain .................... H04L 43/0811
2014/0011518 A1    1/2014    Valaee et al.
(Continued)

FOREIGN PATENT DOCUMENTS

CN    104363202 A    2/2015
WO    WO 2010/109361    9/2010
(Continued)

OTHER PUBLICATIONS

International Search Report and Written Opinion for International Application No. PCT/EP2015/072505 dated Jun. 6, 2016, 11 pages.
(Continued)

*Primary Examiner* — Marisol Figueroa
(74) *Attorney, Agent, or Firm* — Alston & Bird LLP

(57) ABSTRACT

An apparatus obtains at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value (201); and determines, for at least one fingerprint sample of the at least one fingerprint sample, whether the respective fingerprint sample fulfills an inconsistency criterion, wherein the inconsistency criterion is based on the signal strength related value of the respective fingerprint sample and a distance value indicative of an estimated distance between the mobile device and the communication node associated with the fingerprint sample (202).

46 Claims, 12 Drawing Sheets

(56) References Cited

U.S. PATENT DOCUMENTS

2015/0133149 A1 5/2015 Kim et al.
2016/0161592 A1 6/2016 Wirola et al.
2017/0026850 A1* 1/2017 Smith .................. H04W 16/18

FOREIGN PATENT DOCUMENTS

| WO | WO 2011/070551 | 10/2011 |
| WO | WO 2012/139250 | 10/2012 |
| WO | WO 2015/099738 | 7/2015 |

OTHER PUBLICATIONS

Office Action for European Application No. 15 771 950.1 dated Apr. 11, 2019, 3 pages.
Alotaibi, B. et al., *A Passive Fingerprint Technique to Detect Fake Access Points*, Conference Paper (2015) 8 pages.
Chen, Y-C. et al., *Outlier-Detection-Based Indoor Localization System for Wireless Sensor Networks*, International Journal of Navigation and Observation, vol. 2012, Article ID 961785 (2012) 8 pages.
Eisa, S. et al., *Removing Useless Aps and Fingerprints From WiFi Indoor Positioning Radio Maps*, 2013 International Conference on Indoor Positioning and Indoor Navigation (Oct. 2013) 7 pages.
Han, G. et al., *A Two-Step Secure Localization for Wireless Sensor Networks*, The Computer Journal, vol. 56, No. 10 (2013) 1154-1166.
Dalai, A. K. et al., *Intruder Identification in IEEE 802.11 Wireless Infrastructure Using Localization*, International Journal of Future Computer and Communications, vol. 3, No. 6 (Dec. 2014), 372-376.
Maheshwari, M. et al., *Detecting Malicious Nodes in RSS-Based Localization*, 12$^{th}$ IEEE International Symposium on a World of Wireless, Mobile and Multimedia Networks (Jun. 2011), 6 pages.

* cited by examiner

CHECKING FINGERPRINT SAMPLES FOR A RADIO MODEL

FIELD OF THE DISCLOSURE

The invention relates to the field of positioning and more specifically to checking whether fingerprint samples for a radio model that is used for positioning of mobile devices are inconsistent.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

Indoor positioning requires novel systems and solutions that are specifically developed and deployed for this purpose. The "traditional" positioning technologies which are used mainly outdoors, i.e. satellite and cellular positioning technologies, cannot deliver such a performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place. Satellite-based radio navigation signals simply do not penetrate through the walls and roofs strongly enough for the adequate signal reception and the cellular signals have too narrow bands for accurate ranging by default.

Several indoor-dedicated solutions have already been developed and commercially deployed during the past years e.g. solutions based on pseudolites (GPS-like short-range beacons), ultra-sound positioning, BTLE signals (e.g. Nokia High-Accuracy Indoor Positioning, HAIP) and WiFi fingerprinting. What is typical to these solutions is that they require either deployment of totally new infrastructure (beacons, tags and so on) or manual exhaustive radio surveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer devices, such as smartphones.

For an indoor positioning solution to be commercially successful, that is, 1) being globally scalable, 2) having low maintenance and deployment costs, and 3) offering acceptable end-user experience, the solution needs to be based on an existing infrastructure in the buildings and on existing capabilities in the consumer devices. This leads to an evident conclusion that the indoor positioning needs to be based on WiFi- and/or Bluetooth (BT)-technologies that are already supported in the every smartphone, tablet, laptop and even in the majority of the feature phones. It is now needed to find a solution that uses the WiFi- and BT-radiosignals in such a way that makes it possible to achieve 2-3 m horizontal positioning accuracy, close to 100% floor detection with the ability to quickly build the global coverage for this approach.

Huge volumes of indoor WiFi-measurements data could be harvested via crowd-sourcing if the consumer devices were equipped with the necessary functionality to enable the WiFi-data collection as a background process, naturally with the end-user consent. It could also be possible to use volunteers to survey the sites (buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the Wifi-radiomap creation can be based on the machine learning of the indoor WiFi-radiomaps.

SUMMARY OF SOME EMBODIMENTS OF THE INVENTION

An example embodiment of a method according to the invention comprises, performed by at least one apparatus, obtaining at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value; and determining, for at least one fingerprint sample of the at least one fingerprint sample, whether the respective fingerprint sample fulfills an inconsistency criterion, wherein the inconsistency criterion is based on the signal strength related value of the respective fingerprint sample and a distance value indicative of an estimated distance between the mobile device and the communication node associated with the fingerprint sample. The method may further comprise, for each fingerprint sample of the at least one fingerprint sample, estimating the location information associated with the respective fingerprint sample based on the measurement performed by the mobile device at the particular position of this fingerprint sample. The method may further comprise, for each fingerprint sample of the at least one fingerprint sample for which the inconsistency criterion is determined, estimating the distance between the mobile and the communication node associated with the respective fingerprint sample based on the location information of the respective fingerprint sample and a location information of the respective communication node. The method may further comprise estimating the location information of the respective communication node based on the location information of a plurality of fingerprint samples being associated with this communication node. The method may further comprise obtaining a weighting value for each fingerprint sample of the plurality of fingerprint samples being associated with this communication node, wherein a respective weighting value of a fingerprint sample of this plurality of fingerprint samples is determined based on the signal strength related value of the fingerprint sample. The method may further comprise that the inconsistency criterion is further based on a value related to the signal strength of the transmitted signal of the communication node associated with the respective fingerprint sample at the communication node. The method may further comprise that the inconsistency criterion applied to a fingerprint sample of the at least one fingerprint information is based on a representation of a difference between the signal strength related value of the respective fingerprint sample and the value related to the signal strength of the transmitted signal of the communication nodes associated with the respective fingerprint sample. The method may further comprise determining the value related to the signal strength of the transmitted signal of the communication node associated with the respective fingerprint sample at the communication node based on: (i) the maximum value of a set of one or more signal strength related values associated with this communication node; and (ii) an estimated value related to the altitude of the communication node. The method may further comprise that said estimated value related to the altitude of the communication node is determined based on information on the height of a floor associated with this communication node. The method may further comprise, for each fingerprint sample of the at least one fingerprint information for which the inconsistency criterion is determined: (i) determining a value related to a path loss associated with the respective fingerprint sample, and (ii) checking whether the determined value related to a pass loss is below a path loss threshold such that the respective fingerprint sample is determined to fulfill the inconsistency criterion if the determined value related to a pass loss is below the pass loss threshold. The method may further comprise that the value related to a path loss associated with a respective fingerprint sample is determined based on the signal strength related value of the fingerprint sample and the distance value indicative of an estimated distance between the mobile device and the communication node associated with the fingerprint sample. The method may further comprise that said determining, for at least one fingerprint sample of the at least one fingerprint sample, whether the respective fingerprint sample fulfills an inconsistency criterion, is performed for at least one plurality of fingerprint samples, comprise, for each plurality of fingerprint samples of the at least one plurality of fingerprint samples: (i) determining a number of fingerprint samples that fulfill the inconsistency criterion; and (ii) checking whether the number of determined fingerprint samples that fulfill the inconsistency criterion is below a number threshold. The method may further comprise that said number threshold represents a first number threshold, the method comprising, in case that said checking whether the number of determined fingerprint samples that fulfill the inconsistency criterion is below a first number threshold yields in a negative result: (i) checking whether the number of determined fingerprint samples that fulfill the inconsistency criterion is below a second number threshold. The method may further comprise, in case that said checking whether the number of determined fingerprint samples is below the second number threshold yields in a negative result, discarding more than one fingerprint sample of the respective plurality of fingerprint samples. The method may further comprise, in case that said checking whether the number of determined fingerprint samples is below the second number threshold yields in a positive result, removing at least one fingerprint sample from the plurality of fingerprint samples. The method may further comprise: (i) generating a signal representation comprising information on at least one fingerprint sample that fulfills the inconsistency criterion of at least one plurality of fingerprint samples of the at least one plurality of fingerprint samples, (ii) providing said signal representation at an output interface, (iii) receiving a signal representation comprising information on at least one selected fingerprint sample of said at least one fingerprint sample that fulfills the inconsistency criterion at an input interface. The method may further comprise visualizing the at least one fingerprint sample that fulfills the inconsistency criterion on a display. The method may further comprise visualizing at least one further fingerprint sample of the at least one plurality of fingerprint samples on the display. The method may further comprise that said signal representation comprising information on at least one selected fingerprint sample further comprises information on discarding a selected plurality of fingerprint samples of the at least one plurality of fingerprint samples. The method may further comprise discarding the plurality of fingerprint samples in case said signal representation comprising information on at least one selected fingerprint sample comprises information on discarding a selected plurality of fingerprint samples of the at least one plurality of fingerprint samples. The method may further comprise that said signal presentation comprises information on at least one selected fingerprint sample is received based on a user interaction with an input device.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus. The apparatus is a mobile device or a server. The system further comprises a server, in case the apparatus is the mobile device; and the system further comprises the mobile device, in case the apparatus is a server. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for checking whether fingerprint samples are considered to be inconsistent, e.g. for checking health of radio model data. In certain embodiment, any of the presented first apparatuses is an apparatus for checking whether fingerprint samples are considered to be inconsistent, e.g. for checking health of radio model data.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
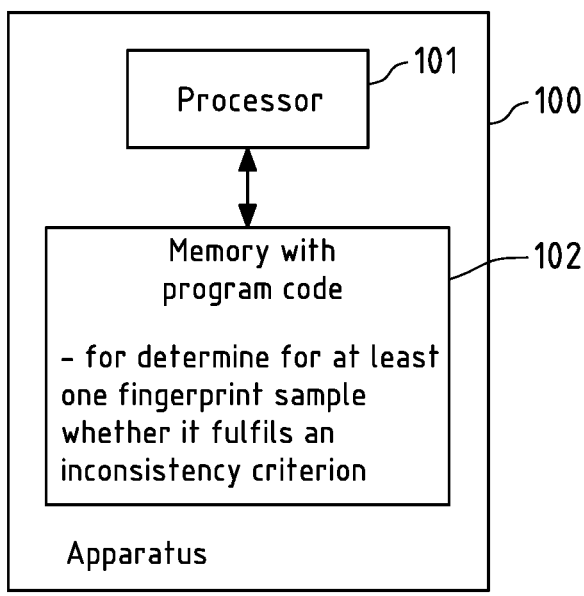
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for determining whether at least one fingerprint sample fulfills an inconsistency criterion. Processor 101 is configured to execute computer program code stored in memory 102 in order to cause an apparatus to perform desired actions.

Apparatus 100 could be a stationary device, like a positioning server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

Figure 2:
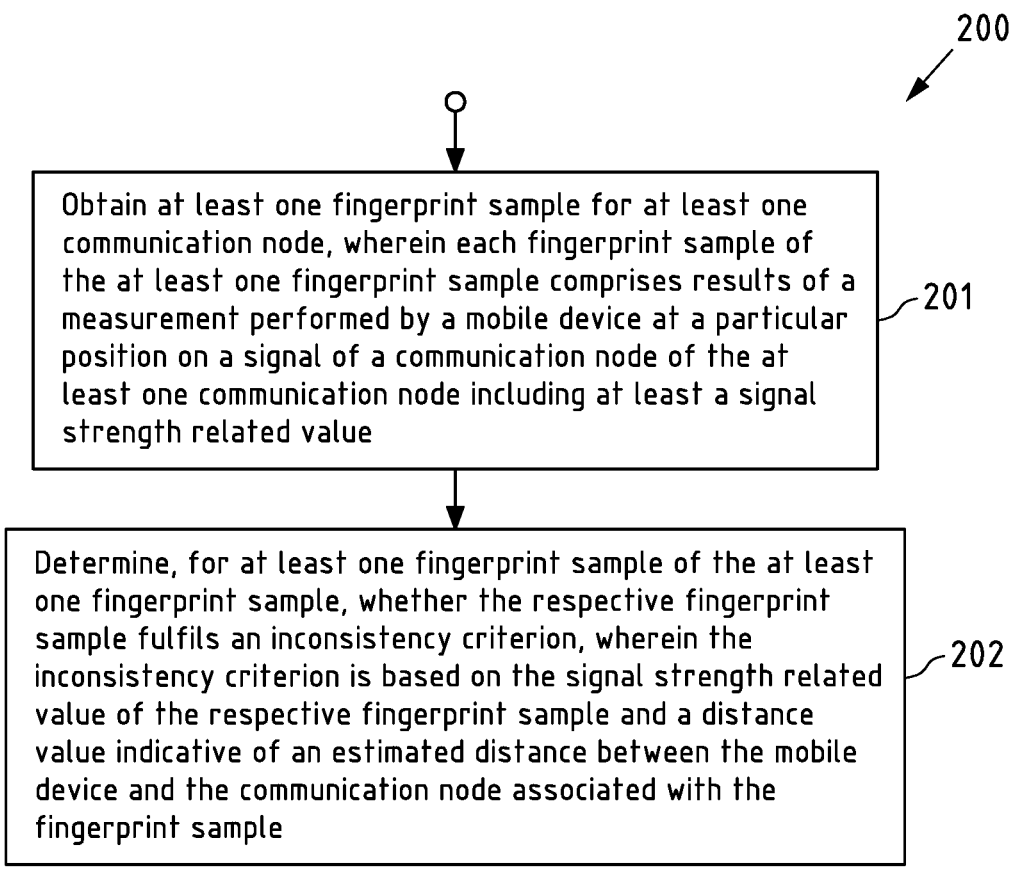
FIG. 2 is a flow chart illustrating an example embodiment of a method.

FIG. 2 is a flow chart illustrating an example embodiment of a method 100. Method 100 may be performed by apparatus 100.

The apparatus 100 obtains at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value. (action 201).

The at least one fingerprint sample may be a single one fingerprint sample or may be a plurality of fingerprint samples. Furthermore, in case of a plurality of fingerprint samples, the at least one communication node may be one communication node or may be a plurality of communication nodes. The at least one communication node may comprise for instance all of the plurality of communication nodes for which measurement results are obtained, or all communication nodes for which the signal strength related value exceeds a threshold. In each case, the at least one communication node may comprise for instance only those communication nodes for which a stored signal strength related value is available.

The apparatus 100 furthermore determines, for at least one fingerprint sample of the at least one fingerprint sample, whether the respective fingerprint sample fulfills an inconsistency criterion, wherein the inconsistency criterion is based on the signal strength related value of the respective fingerprint sample and a distance value indicative of an estimated distance between the mobile device and the communication node associated with the fingerprint sample. (action 202).

If the inconsistency criterion is fulfilled this may indicate that the respective fingerprint sample is considered to be inconsistent or to be suspicious. Furthermore, as an example, it has to be understood that the inconsistency criterion may be considered to be fulfilled if a fingerprint sample does not fulfill a consistency criterion.

The inconsistency criterion may be fulfilled if a mismatch is detected between a signal strength representative obtained from the signal strength related value of the respective fingerprint sample and the distance value indicative of an estimated distance between the mobile device and the communication node associated with this fingerprint sample.

For instance, the signal strength representative may represent a value of a power or an energy determinable based on the signal strength related value. The signal strength representative may indicate the strength of the signal received by the mobile device associated with this fingerprint sample, e.g. by means of a value of power or of a value of energy of the signal received by the mobile device. Or, as another example, the signal strength representative may indicate a signal strength difference between the signal strength of the signal received by the mobile device associated with this fingerprint at the position and the transmission signal strength of the communication node associated with this fingerprint sample. Thus, the signal strength representative may represent a value of a difference between a value of power of the signal received by the mobile device and a value of transmission power of the communication node associated with this fingerprint sample, or, the signal strength representative may represent a value of a difference between a value of energy of the signal received by the mobile device and a value of energy of the signal transmitted by the communication node associated with this fingerprint sample.

As an example, a mismatch may be detected with respect to a fingerprint sample if the signal strength value, which may be denoted as $RSS_i$, wherein subscript i indicates the ith fingerprint sample of the at least one fingerprint sample, indicates that a strong signal is received, and the distance value indicative of an estimated distance between the mobile device and the communication node, wherein the distance value may be denoted as $d_i$, indicates that the position of the measurement of the signal strength value is far from the position of the respective communication node associated with this fingerprint sample. In this case, the fingerprint sample may be considered to fulfill the inconsistency criterion, since it is not reasonable to receive a strong signal although the distance from the measuring mobile device to the transmitting communication node is far. Thus, assumptions about radio propagation modes may be applied with respect to the inconsistency criterion. For instance, the inconsistency criterion might consider the assumption that the radio signal strength must decay over distance, and that strong signals cannot be detected at large distance from the signal source.

For instance, the information that a fingerprint sample fulfills the inconsistency criterion might be used for generating and/or amendment of radio model data. For instance, a fingerprint sample that fulfills the inconsistency criterion might be considered to have a wrong location and might be discarded or might be further processes for further investigation. A radio model may be for instance a radio model for a particular communication node that is defined by values of a limited set of parameters. Such a radio model may be for instance in the form of an equation or a set of equations including the values of the parameters. Alternatively, a radio model may be for instance a radio map, which comprises signal strength values for a plurality of communication nodes mapped to a respective grid point of a grid, the grid points representing geographical locations of a particular site.

Certain embodiments of the invention provide that said results of a measurement performed by a mobile device at a particular position associated with a respective fingerprint sample of the at least one fingerprint sample comprise location information being indicative of the particular position where the mobile device performed the measurement associated with this fingerprint sample.

For instance, the distance value indicative of an estimated distance between the mobile device and the communication node associated with the fingerprint sample may be determined based on this location information being indicative of the particular position where the mobile device performed the measurement associated with this fingerprint sample. As an example, the location information may comprise a latitude information and a longitude information of the particular position. Furthermore, as an option, the location information may comprise an altitude information of the particular position.

Certain embodiments of the invention may comprise, for each fingerprint sample of the at least one fingerprint sample, estimating the location information associated with the respective fingerprint sample based on the measurement performed by the mobile device at the particular position of this fingerprint sample.

For instance, the location information associated with a fingerprint sample of the at least one fingerprint sample may be estimated or determined based on a measurement performed by the mobile device associated with this fingerprint sample.

Or, as another example, the location information associated with a fingerprint sample of the at least one fingerprint sample may be obtained by a user input at the mobile device.

Certain embodiments of the invention may comprise, for each fingerprint sample of the at least one fingerprint sample for which the inconsistency criterion is determined, estimating the distance between the mobile and the communication node associated with the respective fingerprint sample based on the location information of the respective fingerprint sample and a location information of the respective communication node.

For instance, said location information of the respective communication node may be obtained based on an information in the signal transmitted by this communication node. As an example, this information may represent a communication node identifier being indicative of the communication node, and there might be a kind of database comprising the location information of a communication node, wherein this location information is associated with the respective identifier. Thus, based on the communication node identifier received by the mobile device from the communication node, the mobile device or any other entity, e.g. a server, might obtain the location information of this communication from this database. Furthermore, as another example, said information in the signal transmitted by this communication node might represent the location information of the communication.

Certain embodiments of the invention may comprise estimating the location information of the respective communication node based on the location information of a plurality of fingerprint samples being associated with this communication node.

For instance, each communication node of the at least one communication node may transmit a communication node identifier being indicative of the communication node. Thus, this identifier can be received by the measuring mobile device when obtaining a fingerprint sample at a certain position. Accordingly, each fingerprint sample may comprise a respective identifier which indicates the communication node that transmitted the signal associated with this fingerprint sample.

In this certain embodiment it may be assumed that a set of more than one fingerprint samples are obtained (action 201), and a plurality of fingerprint samples of this set of more than one fingerprint samples are associated with the same communication node of the at least one communication node, e.g. by having the same identifier.

Then the location information of the communication node associated with this plurality of fingerprint samples may be estimated based on the location information of each fingerprint sample of this plurality of fingerprint samples associated with this communication node. For instance, the location information of the communication node may be estimated based on an average of the location information of the plurality of fingerprint samples associated with this communication node, since it might be assumed that fingerprint samples are taken at different positions around a communication node and thus the average on the location information of the plurality of fingerprint samples associated with the same communication node may be considered as an estimated of the location of this communication node.

For instance, this estimation of the location information of a communication node may be performed for each communication node of the at least one communication node, wherein said at least one communication node may represent a plurality of communication nodes.

Certain embodiments of the invention may comprise obtaining a weighting value for each of the plurality of fingerprint samples being associated with this communication node, wherein a respective weighting value of a fingerprint sample of this plurality of fingerprint samples is determined based on the signal strength related value of the fingerprint sample.

As an example, such a weighting value of a fingerprint sample may be indicative of an estimated reliability of this fingerprint sample. For instance, a weighting value of a fingerprint sample may be determined based on the signal strength related value of this fingerprint sample, wherein, as an example, the weighting value may indicate more reliability in case of a high signal strength related value (i.e., high signal strength), and the weighting value may indicate less reliability in case of a lower signal strength related value compared to the high signal strength related value.

Furthermore, as an example, a weighting value of a respective fingerprint sample may further be determined based on the signal strength related value of at least one further fingerprint sample, wherein this at least one further fingerprint sample may be associated with the communication node as the respective fingerprint sample.

For instance, this weighting value of a respective fingerprint sample of each of the plurality of fingerprint sample being associated with this communication node may be considered when determining the average of the location information of the plurality of fingerprint samples associated with this communication node, wherein at least one or each location information of the plurality of fingerprint samples might be weighted with the respective weighting value of the respective fingerprint sample comprising the respective location information.

Thus, the location information of a communication node may be estimated in a more reliable way since fingerprints samples having strong signal strength related values can be considered to be more reliable than other fingerprint sample having less strong signal strength related values.

Certain embodiments of the invention may comprise that the inconsistency criterion is further based on a value related to the signal strength of the transmitted signal of the communication node associated with the respective fingerprint sample at the communication node.

For instance, this value related to the signal strength may represent a transmission power of the respective communication node or a value being indicative of the transmission power of the respective communication node.

As an example, the signal transmitted by a communication node, which is received by a mobile device for obtaining a fingerprint sample, may comprise an indication of a transmission power used by the communication node. This may be the case, if the transmission power do not have to be estimated but are known, for example based on information from the operator of the communication node. For instance, the indication of the signal strength related value of the signal transmitted by the communication node comprises an indication of one of an estimated transmission power and an estimated apparent transmission power. This may have the effect that if an estimated apparent transmission power is determined anyhow as parameters of a parametric radio model, there is no need to determine and store additional values for each communication node. The apparent transmission power is to be understood to be the estimated received signal power at a distance to the location of the communication node, for example at a distance of 1 meter. In certain embodiments, the indication of the signal strength related value of the signal transmitted by the communication node may comprise an indication of the strongest received signal strength. This may have the effect that such values are regularly available in fingerprints that may be used for generating radio model data. If such values are stored for each communication node, they may be used with any kind of radio model, for instance for parametric radio models and for radio maps. Furthermore, such values may have the effect that they may be suited to reflect the situation at a particular site particularly well. The indication of a received signal strength may be for instance a received signal strength indicator (RSSI) or a physical Rx level in dBm with a reference value of 1 mW, etc Summarized, information on a transmission power used by the communication nodes can be based for example on observed signals and locations directly from fingerprints, on radio models that have been created using fingerprints and/or on information from an operator who knows the actual location and transmission power.

Furthermore, as another example, the value related to the signal strength of the transmitted signal of the communication node associated with the respective fingerprint sample may be estimated. For instance, the value related to the signal strength of the transmitted signal of the communication node associated with the respective fingerprint may represent an estimated transmission power or an estimated apparent transmission power of the communication node.

Certain embodiments of the invention may comprise determining the value related to the signal strength of the transmitted signal of the communication node associated with the respective fingerprint sample at the communication node based on: the maximum value of a set of one or more signal strength related values associated with this communication node; and an estimated value related to the altitude of the communication node.

The set of one or more signal strength related values associated with this communication node are obtained from respective one or more fingerprint samples all associated with this communication node. For instance, if there are n fingerprint samples associated with this communication node, with n an integer and n≥1, the maximum value of the set of n signal strength related values associated with this communication node may be represented by $RSS_{max}=\max(RSS_i)$, with $i \in \{1 \ldots n\}$.

The estimated value related to the altitude of the communication node may be determined based on the estimated height of the communication node above a floor, and, for example, additionally based on floor information at which the communication node is positioned. For instance, this floor information may be indicative of the floor level and this floor level may be used for estimating the height of the communication node above a floor. The floor information may be a part of location of a fingerprint sample. For instance, the floor information may be included in the signal transmitted by the communication node such that it can be received by the measuring mobile device when obtaining a fingerprint sample associated with this communication node, or, as an alternative, this floor information may be stored in a database, e.g. the previously mentioned database, and may be associated with the communication node identifier of the respective communication node. Thus, as an example, based on an optionally received communication node identifier the floor information may be obtained from this database.

For instance, the height $h_{CN}$ of a communication node above a floor may be estimated as the minimum of $$h = 10^{\frac{(-ATX_{DEF}-\max(RSS_i))}{-10 \cdot NLOS_{DEF}}},$$

wherein $ATX_{DEF}$ represents a default apparent transmission power of this communication node and $NLOS_{DEF}$ represents a default path loss related value, and the height of the floor at which the communication node is located: $h_{CN}=\min(h, floorHeight_{fID})$. The height of the floor $floorHeight_{fID}$ may be obtained based on the floor level indicator fID and the above mentioned database, or, as an example, the floor height $floorHeight_{fID}$ may be contained the fingerprint sample. Thus, as an example, the value $floorHeight_{fID}$ indicates the height of the floor at level fID.

For instance, this height $h_{CN}$ of a communication node above a floor may be considered to represent the estimated value related to the altitude of the communication node or may be considered to represent the estimated value related to the relative altitude of the communication node above the height of a corresponding floor level.

Based on the maximum value of a set of one or more signal strength related values associated with this communication node, i.e. $RSS_{max}=\max(RSS_i)$, with $i \in \{1 \ldots n\}$, and the estimated value related to the altitude of the communication node, which might be represented by $h_{CN}$, the value related to the signal strength of the transmitted signal of the communication node associated with the respective fingerprint sample at the communication node can be determined, e.g. by means of considering a path loss model with respect to the estimated value related to the altitude of the communication node. For instance, the value related to the signal strength of the transmitted signal of the communication node associated with the respective fingerprint sample at the communication node may represent the apparent transmission power $ATX_{CN}$ of the communication node and might be estimated as:

$$ATX_{CN}=\max(RSS_i)+NLOS_{DEF} \cdot 10 \log_{10}(h_{CN})$$

According to certain embodiments of the invention said estimated value related to the altitude of the communication node is determined based on information on the height of a floor associated with this communication node. Thus, the estimated value related to the altitude of the communication node may represent the altitude of the communication node $alt_{CN}$ relative to the main floor which can be estimated as $$alt_{CN} = \begin{cases} h_{CN}, & \text{if } fID = 0 \\ \left( \sum_{j=1}^{fID} floorHeight_{fID} \right) + h_{CN}, & \text{if } fID > 0 \\ \left( \sum_{j=fID}^{-1} -floorHeight_{fID} \right) + h_{CN}, & \text{if } fID < 0 \end{cases}$$

According to certain embodiments of the invention the inconsistency criterion applied to a fingerprint sample of the at least one fingerprint information is based on a representation of a difference between the signal strength related value of the respective fingerprint sample and the value related to the signal strength of the transmitted signal of the communication nodes associated with the respective fingerprint sample.

Thus, this representation of a difference between the signal strength related value of the respective fingerprint sample and the value related to the signal strength of the transmitted signal of the communication nodes associated with the respective fingerprint sample may applied in order to perform a kind of normalization of the received power indicated by the signal strength related value of the respective fingerprint sample.

For instance, this representation of a difference between the signal strength related value of the respective fingerprint sample and the value related to the signal strength of the transmitted signal of the communication nodes associated with the respective fingerprint sample i may be calculated as $$Dpow_i=RSS_i-ATX_{CN}.$$

As an example, this representation of a difference between the signal strength related value of the respective fingerprint sample and the value related to the signal strength of the transmitted signal of the communication nodes associated with a fingerprint sample i may be calculated for one or more different fingerprint samples.

The inconsistency criterion may be fulfilled with respect to a fingerprint sample i if a mismatch is detected between the representation of a difference between the signal strength related value of the respective fingerprint sample and the value related to the signal strength of the transmitted signal of the communication nodes associated with the fingerprint sample i and the distance value d, indicative of an estimated distance between the mobile device and the communication node associated with this fingerprint sample. For instance, said representation of a difference between the signal strength related value of the respective fingerprint sample I and the value related to the signal strength of the transmitted signal of the communication nodes associated with the respective fingerprint sample may be denoted as $Dpow_i$, wherein $Dpow_i$, may be calculated as mentioned above but may also calculated in another way.

As an example, a mismatch may be detected with respect to a fingerprint sample i if $Dpow_i$ indicates that a strong signal is received when obtaining the fingerprint sample by the mobile device and the distance value $d_i$, indicative of an estimated distance between the mobile device and the communication node, indicates that the position of the measurement of the signal strength value is far from the position of the respective communication node associated with this fingerprint sample. In this case, the fingerprint sample may be considered to fulfill the inconsistency criterion, since it is not reasonable to receive a strong signal although the distance from the measuring mobile device to the transmitting communication node is far. Thus, assumptions about radio propagation modes may be applied with respect to the inconsistency criterion. For instance, the inconsistency criterion might consider the assumption that the radio signal strength must decay over distance, and that strong signals cannot be detected at large distance from the signal source.

Certain embodiments of the invention may comprise, for each fingerprint sample of the at least one fingerprint information for which the inconsistency criterion is determined: (i) determining a value related to a path loss associated with the respective fingerprint sample, and (ii) checking whether the determined value related to a pass loss is below a path loss threshold such that the respective fingerprint sample is determined to fulfill the inconsistency criterion if the determined value related to a pass loss is below the pass loss threshold.

Determining a value related to a path loss associated with the respective fingerprint sample can be performed based on the signal strength related value of the fingerprint sample and the distance value indicative of an estimated distance between the mobile device and the communication node associated with the fingerprint sample.

Furthermore, the value related to a path loss associated with the respective fingerprint sample may be further determined based on the estimated transmission value related to the signal strength of the transmitted signal of the communication node associated with the respective fingerprint sample, wherein, as an example the representation of a difference between the signal strength related value of the respective fingerprint sample and the value related to the signal strength of the transmitted signal of the communication nodes associated with the respective fingerprint sample I, which may be calculated as $$Dpow_i = RSS_i - ATX_{CN},$$

may be used for determining value related to a path loss associated with the respective fingerprint sample.

For instance, the value related to a path loss associated with the respective fingerprint sample may represent a path loss exponent $n_i$, wherein subscript i may denote the respective ith fingerprint sample associated with this a path loss exponent $n_i$, wherein the path loss exponent $n_i$, may be calculated as:

$$n_i = \frac{Dpow_i}{-10 \log_{10}(d_i)},$$

wherein $RSS_i$ and $ATX_{CN}$ in $Dpow_i$ may represent the received and transmitted powers in dBm, and $d_i$ may represent the distance between the estimated location of the fingerprint sample and the respective communication node in meters. It has to be understood that different ways for calculating the path loss exponent $n_i$ may be applied.

It is checked whether the determined value related to a pass loss of the fingerprint is below a path loss threshold such that the respective fingerprint sample is determined to fulfill the inconsistency criterion if the determined value related to a pass loss is below the pass loss threshold. If the determined value related to a pass loss is below the path loss threshold this may indicate that the power or energy of the received signal when obtaining this fingerprint sample does not match with the estimated distance $d_i$ between the estimated location of the fingerprint sample and the respective communication node and thus this fingerprint sample may be considered to be inconsistent, i.e., to be wrong, e.g. having a wrong location information and/or a wrong signal strength related value.

It may be considered that path loss exponents have physical limitations, wherein the path loss threshold may be selected based on the physical limitation in a specific scenario, wherein the path loss threshold is selected to be lower than the path loss exponent in the specific scenario. For instance, in case of line of sigh propagation, the lower limit of path loss is equal to 2 (or approximately equal to 2).

As an example, the path loss threshold may be set to 1, i.e., fingerprint samples being associated with a path loss exponent $n_i$, <1 may be considered to fulfill the inconsistency criterion. Of course, other well-suited path loss thresholds may be used, e.g. 0,7, or 0,8 or 0,9 or 1,1. For instance, the path loss threshold may be between 0,5 and 1,5, in particular between 0,8 and 1,2.

According to certain embodiments of the invention said determining, for at least one fingerprint sample of the at least one fingerprint sample, whether the respective fingerprint sample fulfills an inconsistency criterion, is performed for at least one plurality of fingerprint samples, and wherein said certain embodiments of the invention comprises, for each plurality of fingerprint samples of the at least one plurality of fingerprint samples: (i) determining a number of fingerprint samples that fulfill the inconsistency criterion; and (ii) checking whether the number of determined fingerprint samples that fulfill the inconsistency criterion is below a number threshold.

For instance, a plurality of fingerprint samples of the at least one plurality of fingerprint samples may represent fingerprint samples associated with the same connection node or may represent fingerprint samples associated with the same floor or same tile of a building or may represent fingerprint samples associated with a same area. Or, as an example, a plurality of fingerprint samples of the at least one fingerprint sample may represent fingerprint samples collected by the same user and/or collected by the same mobile device. Or, for instance, a plurality of fingerprint samples of the at least one fingerprint sample may represent fingerprint samples collected in a specific time frame.

If the number of determined fingerprint samples that fulfill the inconsistency criterion is below the number threshold this may be considered to indicate that the quality of the respective plurality of fingerprint samples of the at least one plurality of fingerprint samples is good. Thus, in this case, the respective plurality of fingerprint samples may be accepted for further processing, e.g. to be used for a radio map, wherein this radio map may be applied for indoor positioning.

If the number of determined fingerprint samples that fulfill the inconsistency criterion is not below the number threshold this may be considered to indicate that too many fingerprint sample in this plurality of fingerprint samples of the at least one plurality of fingerprint samples are inconsistent and thus, a further processing may be necessary with at least some of the fingerprint samples of this plurality of fingerprint samples, wherein said further processing may comprise a further checking of validity of those fingerprint samples considered to be inconsistent.

It has to be understood that this embodiment for determining, for at least one fingerprint sample of the at least one fingerprint sample, whether the respective fingerprint sample fulfills an inconsistency criterion, is performed for at least one plurality of fingerprint samples, and wherein said certain embodiments of the invention comprises, for each plurality of fingerprint samples of the at least one plurality of fingerprint samples: (i) determining a number of fingerprint samples that fulfill the inconsistency criterion; and (ii) checking whether the number of determined fingerprint samples that fulfill the inconsistency criterion is below a number threshold, may also cover determining, for at least one fingerprint sample of the at least one fingerprint sample, whether the respective fingerprint sample does not fulfill an consistency criterion (which is equivalent to determining whether the respective fingerprint sample fulfills an inconsistency criterion), is performed for at least one plurality of fingerprint samples, and wherein said certain embodiments of the invention comprises, for each plurality of fingerprint samples of the at least one plurality of fingerprint samples: (i) determining a number of fingerprint samples that does not fulfill the consistency criterion; and (ii) checking whether the number of determined fingerprint samples that does not fulfill the inconsistency criterion is below a number threshold According to certain embodiments of the invention said number threshold represents a first number threshold, and said certain embodiments comprises, in case that said checking whether the number of determined fingerprint samples that fulfill the inconsistency criterion is below a first number threshold yields in a negative result:

checking whether the number of determined fingerprint samples that fulfill the inconsistency criterion is below a second number threshold.

For instance, if the number of the determined fingerprint samples that fulfill the inconsistency criterion is not below the second number threshold, i.e., in case that said checking whether the number of determined fingerprint samples is below the second number threshold yields in a negative result, the respective plurality of fingerprint samples of the at least one plurality of fingerprint samples may be considered to be of poor quality and the respective plurality of fingerprint samples may be discarded, i.e., not used for a radio map generation and for positioning.

Certain embodiments of the invention may comprise, in case that said checking whether the number of determined fingerprint samples is below the second number threshold yields in a negative result, discarding more than one fingerprint sample of the respective plurality of fingerprint samples.

For instance, fingerprint samples of the respective plurality of fingerprint sample of the at least one plurality of fingerprint samples that fulfill the inconsistency criterion may be considered to represent a set of fingerprint samples. The set of fingerprint samples may comprise any fingerprint samples of the respective plurality of fingerprint sample that fulfill the inconsistency criterion or one or more fingerprint samples of the respective plurality of fingerprint sample that fulfill the inconsistency criterion.

Said removed at least one fingerprint sample may be of this set of fingerprint samples. For instance, this removing may be performed based on an algorithm that checks the validity of the fingerprint samples of the set of fingerprint samples. Then, the remaining fingerprint samples of the plurality of fingerprint samples may be used for further processing, e.g. be used for a radio map, wherein this radio map may be applied for indoor positioning.

Or, as another example, said more than one fingerprint sample may represent the whole plurality of fingerprint samples, i.e. all fingerprint samples of the plurality of fingerprint samples are be discarded and not used for positioning.

Certain embodiments of the invention may comprise, in case that said checking whether the number of determined fingerprint samples is below the second number threshold yields in a positive result, removing at least one fingerprint sample from the plurality of fingerprint samples.

Certain embodiments of the invention may comprise, in case that said checking whether the number of determined fingerprint samples is below the second number threshold yields in a positive result: (i) generating a signal representation comprising information on at least one fingerprint sample that fulfills the inconsistency criterion of at least one plurality of fingerprint samples of the at least one plurality of fingerprint samples, (ii) providing said signal representation at an output interface.

Certain embodiments of the invention may comprise receiving a signal representation comprising information on at least one selected fingerprint sample of said at least one fingerprint sample that fulfills the inconsistency criterion at an input interface.

Certain embodiments of the invention may comprise visualizing the at least one fingerprint sample that fulfills the inconsistency criterion on a display.

Thus, as an example, the at least one fingerprint sample that fulfills the inconsistency criterion of the respective plurality of fingerprint samples can be visualized on a display and thus may be presented to a user for further investigation. For instance, the at least one fingerprint sample that fulfills the inconsistency criterion may be visualized on a kind of map shown on the display, wherein a fingerprint sample of this at least one fingerprint sample may be shown on a position in this map according to the location information being indicative of the particular position where the mobile device performed the measurement associated with this fingerprint sample. Furthermore, as an example, further information may be displayed on the display, e.g. an indicator of the signal strength related value of the respective fingerprint sample.

Certain embodiments of the invention may comprise receiving a signal representation comprising information that the at least one visualized fingerprint sample is accepted. Thus, in this case, a user may perform an input in order to accept the at least one fingerprint sample, i.e. no fingerprint sample is removed from this at least one fingerprint sample. For instance, it may happen that none of the at least one fingerprint samples has to be deleted, e.g. when inconsistency criterion failed marked correct fingerprint samples as inconsistent.

Certain embodiments of the invention may comprise visualizing at least one further fingerprint sample of the at least one plurality of fingerprint samples on the display.

For instance, said at least on further fingerprint sample may be of the same plurality of fingerprint samples as the at least one fingerprint sample that fulfills the inconsistency criterion. As an example, all fingerprint samples or a subset of fingerprint samples of the respective plurality of fingerprint samples may be visualized on the display. Furthermore, as an example, the at least one fingerprint sample that fulfill the inconsistency criterion may be indicated on the display such that a user can see which fingerprint samples of the respective plurality of fingerprint samples are considered to be inconsistent. Furthermore, under the assumption that the at least one plurality of fingerprint samples are several pluralities of fingerprint samples, this displaying may be performed for at least two pluralities of fingerprint samples of the several pluralities of fingerprint samples. Thus, the user may investigate how consistent fingerprint samples are between different pluralities of fingerprint samples, and such may detected which of them are correct and which of them are not.

According to certain embodiments of the invention said signal representation comprises information on at least one selected fingerprint sample further comprises information on discarding a selected plurality of fingerprint samples of the at least one plurality of fingerprint samples.

Certain embodiments of the invention may comprise discarding the plurality of fingerprint samples in case said signal representation comprising information on at least one selected fingerprint sample further comprises information on discarding a selected plurality of fingerprint samples of the at least one plurality of fingerprint samples.

Thus, as an example, a user may select the at least one selected fingerprint sample, e.g. by means of an input interface. Accordingly, the user may use the information provided by the visualization on the display in order to select at least one fingerprint sample to be discarded. As an example, the user may select all fingerprint samples of a respective plurality of fingerprint samples to be discarded, and thus this respective plurality of fingerprint samples mayl not be used for further processing, e.g. not used for generating radio model data. Or, as another example, the user may select a subset of fingerprint samples of the respective plurality of fingerprint sample to be discarded, e.g. by choosing fingerprint samples of the tile, floor or time frame as inconsistent fingerprint.

According to certain embodiments of the invention said signal presentation comprising information on at least one selected fingerprint sample is received based on a user interaction with an input device.

According to certain embodiments of the invention the at least one communication node comprises at least one module of the following module set: (i) at least one terrestrial non-cellular transmitter; (ii) at least one access point of at least one wireless local area network; (iii) at least one Bluetooth transmitter; and (iv) at least one Bluetooth low energy transmitter.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary.

In addition, the end-user experience may be acceptable with these technologies, since a horizontal positioning accuracy of 2-3 meters as well as close to 100% reliability in floor detection may be achieved. It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well. The communication nodes do not even have to be ground-based necessarily. For example, the communication nodes could also comprise communication nodes in a ship.

According to certain embodiments of the invention the at least one apparatus is or belongs to one of: (i) the at least one mobile device; and (ii) a server that is configured to obtain results of measurements for at least one communication node from at least one mobile device.

For instance, if the at least one apparatus is or belongs to the at least one mobile device, for instance, a mobile device of the at least one mobile device may collected at least one fingerprint sample or at least one plurality of fingerprint samples, i.e. each of the at least one mobile device might perform the measurement for obtaining the respective fingerprint sample of the at least one fingerprint sample. Furthermore, each mobile device of the at least one mobile device may determine, for at least one fingerprint sample of the at least one fingerprint sample, whether the respective fingerprint sample fulfills the inconsistency criterion.

As an example, this may be performed for each fingerprint sample of the at least one plurality of fingerprint samples. Furthermore, as example, some or all of the other certain embodiment may be performed by the mobile device. Accordingly, the fingerprint samples can be checked on the client side, i.e. by means of the mobile device, wherein the display may represent a display of the mobile device or at least a display connected to the mobile device, such that a user of the mobile device may discard at least one fingerprint sample and/or a complete plurality of fingerprint sample. Accordingly, a user might detect wrong fingerprint sample "on the fly" such that the remaining fingerprint samples, after fingerprint samples have been removed from the at least one plurality of fingerprint samples, may be transmitted from the mobile device to a server, e.g. to be used for indoor positioning. This would show the advantage, that the server receives fingerprint samples that have been checked with respect to be not inconsistent.

Or, as another example, if the at least one apparatus is or belongs to a server that is configured to obtain results of measurements for at least one communication node from at least one mobile device, e.g. for a plurality of communication nodes from mobile devices. In this case, the server may obtain or generate the at least one fingerprint sample based on the results of measurements. For instance, the server may receive the at least one fingerprint sample from at least mobile device, wherein each of the at least one mobile device might perform the measurement for obtaining the respective fingerprint sample of the at least one fingerprint sample. Then, the server may determine, for at least one fingerprint sample of the at least one fingerprint sample, whether the respective fingerprint sample fulfills the inconsistency criterion, wherein this may be performed for each fingerprint sample of the at least one plurality of fingerprint samples. Furthermore, as example, some or all of the other certain embodiment may be performed by the server. Accordingly, the fingerprint samples can be checked on the server side, i.e. in order to prevent generation of wrong radio maps due to wrong fingerprint data. This may show the advantage that not so much calculation power is need on client side (i.e. with respect to the at least one mobile device) and that users of the mobile device might not be needed in order to check fingerprint sample. Thus, the display may represent a display of the server or at least a display connected to the server, such that a user of the server, e.g. an operator or provider, may discard at least one fingerprint sample and/or a complete plurality of fingerprint samples.

Figure 3:
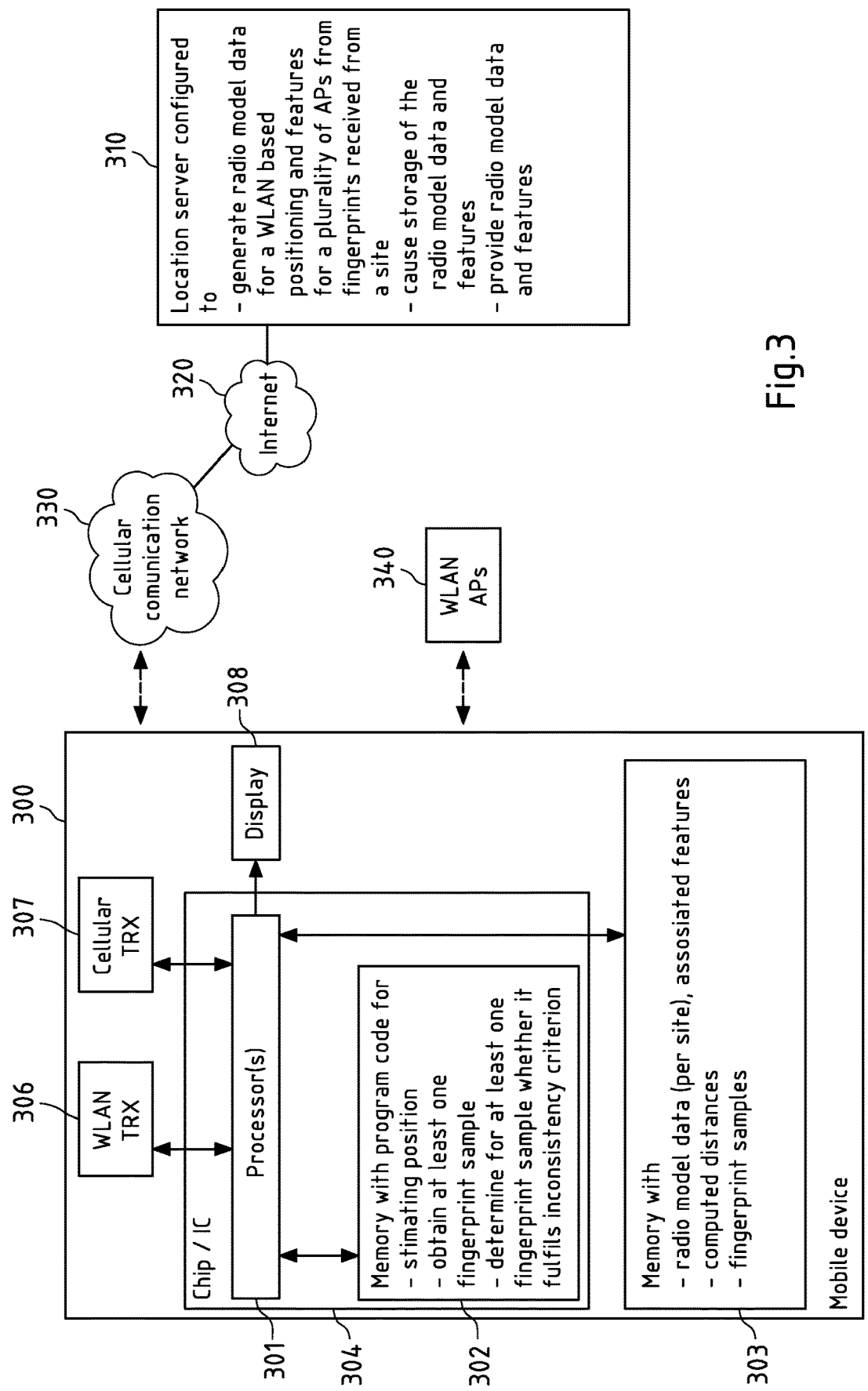
FIG. 3 is a schematic block diagram of a first example embodiment of a system.

FIG. 3 is a schematic block diagram of a first example embodiment of a system according to the invention. The system may support a checking whether at least one fingerprint sample fulfills the inconsistency criterion at a mobile device.

The system comprises a mobile device 300 and a location server 310. The system further comprises a network 320, by way of example the Internet. The system further comprises a cellular communication network 330 that is connected to the Internet 320. The system further comprises a number of WLAN access points (AP) 340.

Mobile device 300 may be for instance a mobile terminal, like a regular smartphone or a tablet PC. Mobile device 300 comprises a processor 301 that is linked to a first memory 302, to a second memory 303, to a WLAN component 306, to a cellular communication component 307 and to a display 308.

Processor 301 is configured to execute computer program code, including computer program code stored in memory 302, in order to cause mobile device 300 to perform desired actions.

Memory 302 store computer program code for obtaining the at least one fingerprint sample, and computer program code for performing a measurement on a signal of a communication node including at least one signal strength related value, and computer program code for determining, for at least one fingerprint sample, whether the respective fingerprint sample fulfills the inconsistency criterion, and, for instance, computer program for estimating a position of mobile device 300 using stored radio models, e.g. in order to measure a location information being indicative of the particular position where the mobile device performed the measurement associated with a fingerprint sample, and computer program code for communicating with server 310. Some of the program code in memory 302 may be similar to the program code in memory 102. In addition, memory 302 could store computer program code configured to realize other functions. In addition, memory 302 could also store other kind of data. For instance, memory 302 may store computer program for performing some or all certain embodiments of the invention.

Processor 301 and memory 302 may optionally belong to a chip or an integrated circuit 304, which may comprise in addition various other components, for instance a further processor or memory.

Memory 303 is configured to store various kind of data, including for example radio model data for particular sites, which are associated with features for communication nodes, computed distances, the at least on fingerprint sample, and, for instance, the at least one plurality of fingerprint samples, and a counter for counting the number of fingerprint samples that fulfill the inconsistency criterion of a respective plurality of fingerprint samples. Memory 303 could be configured to store any other desired data as well.

WLAN component 306 may include at least a WLAN transceiver (TRX). WLAN component 306 may enable mobile device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication could be stored in an own memory of WLAN component 306 and executed by an own processor of WLAN component 306, or it could be stored for example in memory 302 and executed for example by processor 301.

Cellular communication component 307 includes at least a cellular transceiver. It enables mobile device 300 to communicate with other entities via cellular communication network 330. It could be a cellular engine that is configured to take care of all processing required for a cellular communication. Alternatively, at least some of the processing that is required for a cellular communication may be realized by processor 301 executing corresponding additional program code stored in memory 302.

Display 308 could be a touchscreen or a display that is not touch sensitive. This display 308 may for instance be used for user interaction, as described with respect to certain embodiments of the invention, e.g. in order to select at least one fingerprint sample to be discarded/removed. Furthermore, another input interface of mobile device 300 may be used for user interaction.

It is to be understood that mobile device 300 could comprise various other components, like user input means and speakers and, as an example, at least one GNSS component like a GPS receiver.

Component 304 or mobile device 300 could be an example embodiment of an apparatus according to the invention.

Location server 310 is a server that is configured to generate radio model data for a WLAN based positioning and a feature for each of a plurality of access points based on fingerprints received from a respective localization site. It is also configured to cause storage of the generated data. It is also configured to provide radio model data and features to mobile devices. Server 310 could comprise a memory for storing data and/or it could be configured to access an external memory storing data, optionally via another server.

Cellular communication network 330 could be any kind of cellular communication network, like a Global System for Mobile Communications (GSM), a CDMA2000, a Universal Mobile Telecommunications System (UMTS), or a long term evolution (LTE) based communication network. The WLAN access points 340 could be access points of one or more WLANs. The WLAN or WLANs may but do not have to be connected to the Internet 320.

Figure 4:
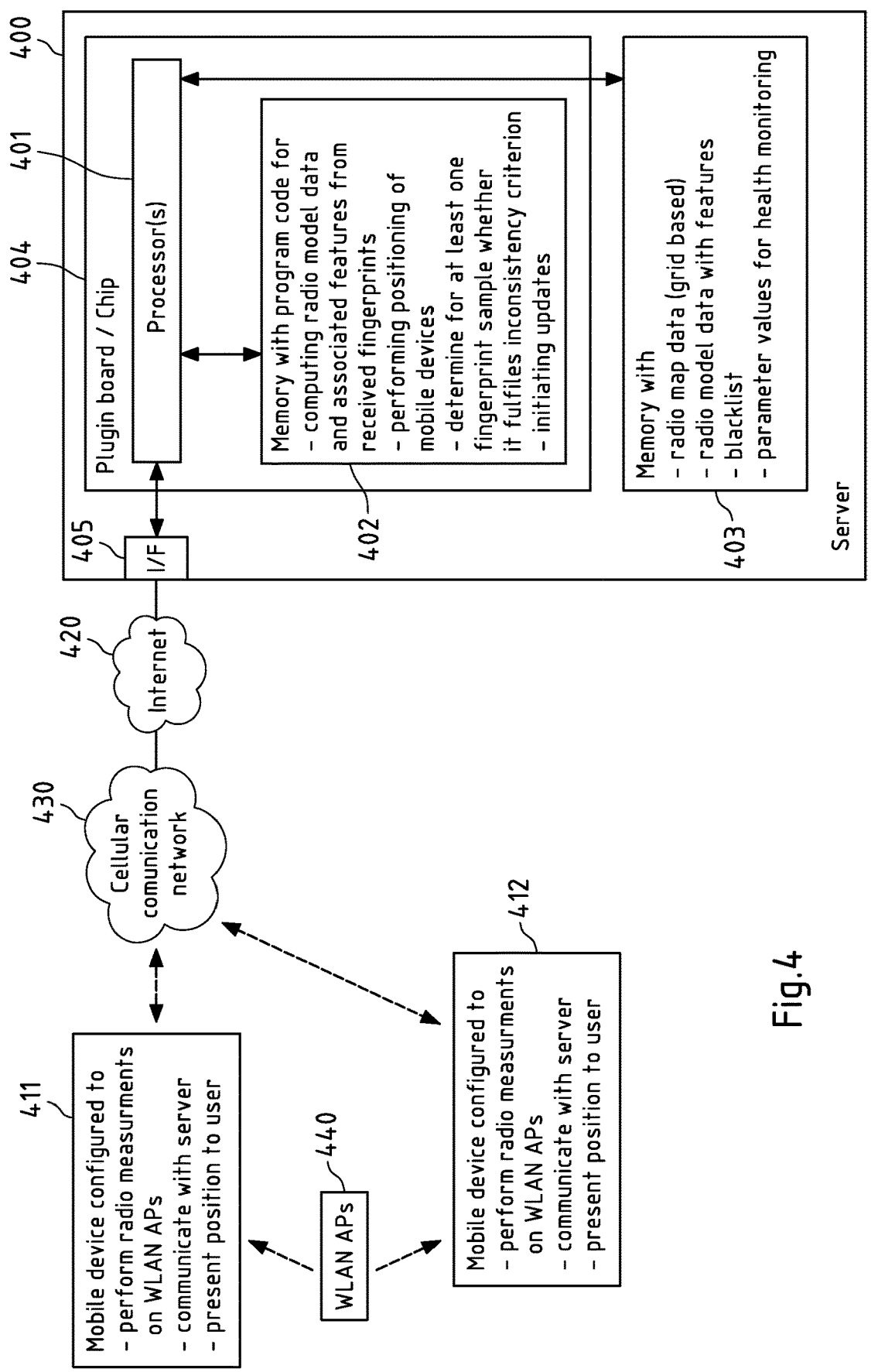
FIG. 4 is a schematic block diagram of a second example embodiment of a system.

FIG. 4 is a schematic block diagram of a second example embodiment of a system according to the invention. In this case, the system may support determining, for at least one fingerprint sample of the at least one fingerprint sample, whether the respective fingerprint sample fulfills the inconsistency criterion, wherein this may be performed for each fingerprint sample of the at least one plurality of fingerprint samples at a server.

The system comprises a server 400 and a plurality of mobile devices 411, 412. The system further comprises a network 420, by way of example the Internet. The system further comprises a cellular communication network 430 that is connected to the Internet 420. The system further comprises a number of WLAN access points 440.

Server 400 may be for instance a server that is provided specifically for performing positioning computations for mobile devices and, as an example, for monitoring the quality of stored radio model data, or it could be a server which also takes care of generating and updating the radio models, or it could be any other server. Server 400 comprises a processor 401 that is linked to a first memory 402, to a second memory 403 and to an interface (I/F) 405.

Processor 401 is configured to execute computer program code, including computer program code stored in memory 402, in order to cause server 400 to perform desired actions.

Memory 402 stores computer program code for computing and storing radio model data and associated features from received fingerprints, computer program code for performing a positioning of mobile devices upon request based on received results of measurements on radio signals and stored radio model data, computer program code for determining, for at least one fingerprint sample, whether the respective fingerprint sample fulfills the inconsistency criterion, and, for instance, for initiating an update of the stored radio model data. Some of the program code may be similar to the program code stored in memory 102. In addition, memory 402 could store computer program code configured to realize other functions, for instance for providing assistance data to mobile devices upon request. In addition, memory 402 could also store other kind of data. For instance, memory 402 may store computer program for performing some or all certain embodiments of the invention.

Processor 401 and memory 402 may optionally belong to a plug-in board or a chip with an integrated circuit 404, which may comprise in addition various other components, for instance a further processor or memory.

Memory 403 is configured to store data on a per site basis. It may be configured to store data including for example data of a grid based radio map, data for parametric radio models and associated features various parameter values that are used in monitoring the health of the radio model data. In addition, it could store other data.

It is to be understood that the data of memory 403 could also be distributed to several memories, which may be partly or completely external to server 400. For example, the blacklist and parameter values used for monitoring the health of stored radio model data could be stored internal to server 400 and radio map data and radio model data could be stored at an external memory that is accessible via another server.

Interface 405 is a component which enables server 400 to communicate with other devices, like mobile device 411 and 412, via networks 420 and 430. It could also enable server 400 to communicate with other entities, like other servers or terminals of staff of a positioning service provider operating server 400. Interface 405 could comprise for instance a TCP/IP socket.

It is to be understood that server 400 could comprise various other components.

Component 404 or server 400 could be an example embodiment of an apparatus according to the invention.

Mobile devices 411, 412 may be for instance mobile terminals, like regular smartphones or tablet PCs. They are configured to perform radio measurements on WLAN access points, to communicate with server 400 and to present a position of mobile device 411, 412 to a user.

Cellular communication network 430 could be again any kind of cellular communication network.

The WLAN access points 440 could be again access points of one or more WLANs. The WLAN or WLANs may but do not have to be connected to the Internet 420.

While the systems of FIG. 3 and FIG. 4 are different in that the system of FIG. 3 enables a mobile device 300 to determine whether at least one fingerprint sample fulfills an inconsistency criterion and the system of FIG. 4 enables a server 400 to determine whether at least one fingerprint sample fulfills an inconsistency criterion, the actual operations that are carried out for determining whether at least one fingerprint sample fulfills an inconsistency criterion may be similar.

Figure 5:
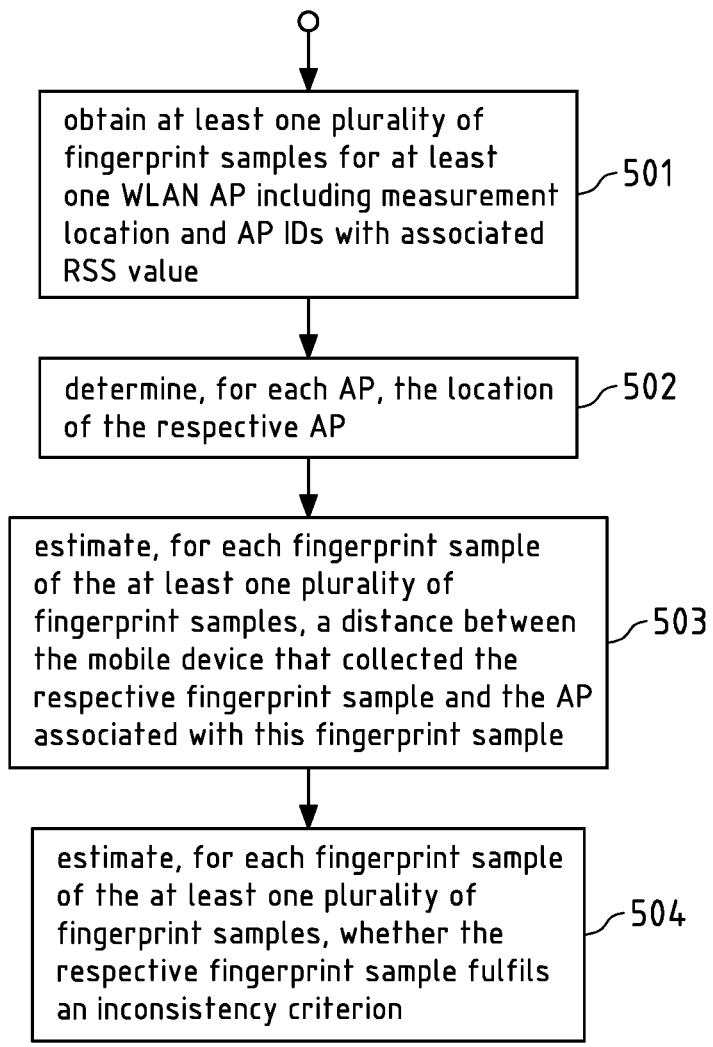
FIG. 5 is a flow chart illustrating first example operations in the system of FIG. 3 or 4.
Figure 6:
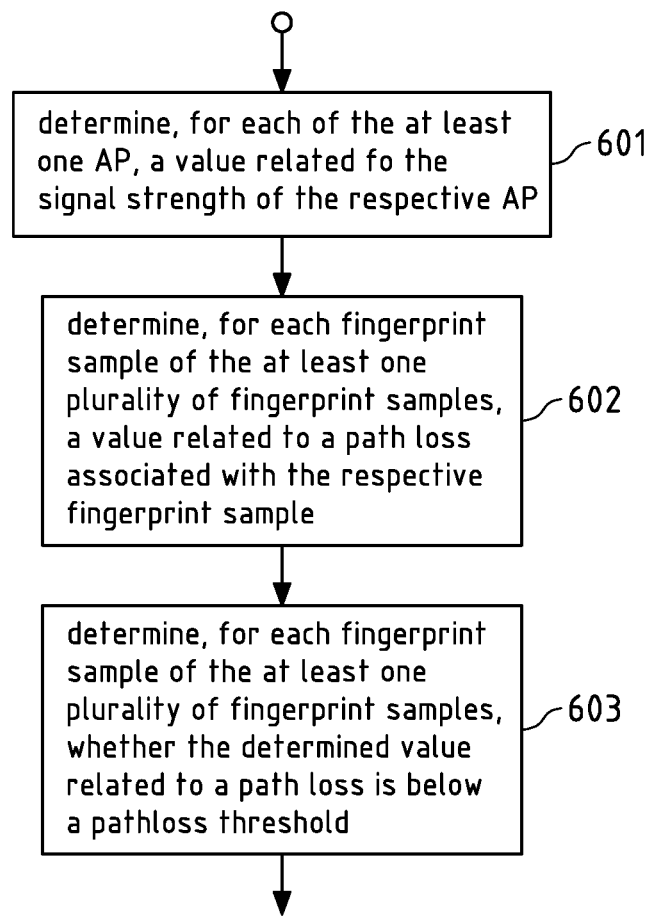
FIG. 6 is a flow chart illustrating second example operations in the system of FIG. 3 or 4.
Figure 7:
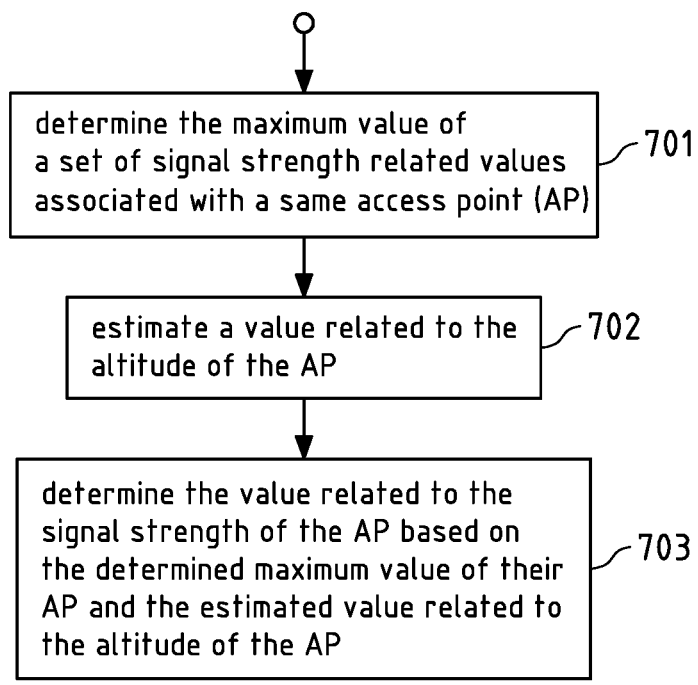
FIG. 7 is a flow chart illustrating third example operations in the system of FIG. 3 or 4.

FIGS. 5 to 7 are flow charts illustrating example operations in the system of FIG. 3 or FIG. 4.

Further example operations in the system of FIG. 3 or FIG. 4 will now be described with reference to FIG. 5.

In the case of FIG. 4, processor 401 and some of the program code stored in memory 402 may cause server 400 of FIG. 4 to perform the presented actions when program code is retrieved from memory 402 and executed by processor 401. The same operations could be performed by mobile device 310 of FIG. 3.

For instance, in order to be able to create radio model data for a particular localization site, like a particular building, server 400 obtains fingerprints collected by mobile devices at the site or mobile devices 300 may collect fingerprints. The collecting mobile devices may be devices of users who allowed their devices to collect and transmit fingerprints, or devices of special surveying persons hired to survey the particular site. Each fingerprint includes results of measurements at a measurement location at a certain point of time on signals transmitted by WLAN access points and an indication of the measurement location. The results of the measurements may contain an identifier (ID) of each access point, for example a basic service set identification (BSSID), like the medium access control (MAC) address of the observed access point, and the service set identifier (SSID) of the observed access point, wherein a access point may represent a communication node. Associated with each access point identifier, the results of the measurements further contain a signal strength related value indicating a measured signal strength of a signal transmitted by the identified access point, for example a received signal strength (RSS) value in the form of a physical Rx level in dBm. The location of measurement included in a fingerprint could be determined by a fingerprint collecting mobile device for instance using an assisted satellite signal based positioning, or the user of the mobile device could be required to enter information on a respective measurement location. (action 501). Thus, action 501 may correspond to action 201 depicted in FIG. 2. The location of measurement included in a fingerprint may correspond to the location information being indicative of the particular position where the mobile device performed the measurement associated with this fingerprint sample, i.e. where the mobile device collected the fingerprint sample.

For instance, a plurality of fingerprint samples of the at least one plurality of fingerprint samples may represent fingerprint samples associated with the same access point (AP) (i.e., the same connection node) or may represent fingerprint samples associated with the same floor or same tile of a building or may represent fingerprint samples associated with a same area. Or, as an example, a plurality of fingerprint samples of the at least one fingerprint sample may represent fingerprint samples collected by the same user and/or collected by the same mobile device. Or, for instance, a plurality of fingerprint samples of the at least one fingerprint sample may represent fingerprint samples collected in a specific time frame.

Then, for each access point (AP) (i.e., for each connection node), the location of the respective AP is determined. (action 502)

For instance, said location of the respective communication node may be obtained based on AP identifier by the AP. As an example, there might be a kind of database comprising location information on an AP, wherein this location information is associated with the respective AP identifier. Thus, based on the AP identifier received by the mobile device from the communication node, the mobile device or any other entity, e.g. a server, might obtain the location information of this communication from this database.

Said determining to location of the respective AP may comprise estimating the location of the AP of the at least one AP based on the location information of a set of fingerprint samples being associated with this AP.

For instance, the AP identifier received by the measuring mobile device when obtaining a fingerprint sample at a certain position may be used for identifying fingerprint samples of a set of fingerprint samples associated with the same AP.

Then the location of an AP may be estimated based on the location information of each fingerprint sample of this set of fingerprint samples associated with this AP. For instance, the location information of the communication node may be estimated based on an average of the location information of the plurality of fingerprint samples associated with this communication node, since it might be assumed that fingerprint samples are taken at different positions around a communication node and thus the average on the location information of the plurality of fingerprint samples associated with the same communication node may be considered as an estimated of the location of this AP, e.g. as calculated below $$\begin{bmatrix} Lat_{CN} \\ Lon_{CN} \end{bmatrix} = \sum_{i=1}^{M} w_i \begin{bmatrix} Lat_i \\ Lon_i \end{bmatrix},$$

wherein the set of fingerprint samples associated with this AP (i.e., connection node CN), represent M fingerprint samples, and wherein, as an example, the location of the position where a respective fingerprint sample I was collected is represented by the latitude $Lat_i$ and the longitude $Lon_i$, such that location of this AP may be represented by an estimated Latitude $Lat_{CN}$ and an estimated longitude $Lon_{CN}$. However, any other well suited coordinate system for representation positions may be applied. The value $w_1$ represents an optional weighting factor.

This optional a weighting value may be obtained for each of the set of fingerprint samples being associated with this AP, wherein a respective weighting value of a fingerprint sample of this plurality of fingerprint samples is determined based on the signal strength related value of the fingerprint sample.

As an example, such a weighting value of a fingerprint sample may be indicative of an estimated reliability of this fingerprint sample. For instance, a weighting value of a fingerprint sample may be determined based on the signal strength related value of this fingerprint sample, wherein, as an example, the weighting value may indicate more reliability in case of a high signal strength related value (i.e., high signal strength), and the weighting value may indicate less reliability in case of a lower signal strength related value compared to the high signal strength related value.

Furthermore, as an example, a weighting value of a respective fingerprint sample may further be determined based on the signal strength related value of at least one further fingerprint sample, wherein this at least one further fingerprint sample may be associated with the communication node as the respective fingerprint sample.

$$w_i = \frac{10^{\frac{RSS_i}{10}}}{\sum_{i=1}^{M} 10^{\frac{RSS_i}{10}}}$$

As an example, the set of M fingerprint sample associated with the same AP may contain only fingerprint samples having an RSS larger than a threshold. The threshold could be set of −40 dBm or to be set of −50 dBm, but could also be set any other value.

Then, for each fingerprint sample of the at least one plurality of fingerprint samples, a distance $d_i$ between the mobile device that collected the respective fingerprint sample and the AP associated with this fingerprint sample is estimated. (action 502). It has to be understood that this may not necessarily be performed for each fingerprint sample of the plurality of fingerprint sample, but at least for one or more then one fingerprint sample of the plurality of fingerprint samples. Thus, $d_i$ may be considered to represent a distance value indicative of an estimated distance between the mobile device and the communication node associated with the fingerprint sample. $d_i$ may be determined based on this location information being indicative of the particular position where the mobile device performed the measurement associated with this fingerprint sample. As an example, the location information may comprise a latitude information and a longitude information of the particular position.

Then, it is determined, for each fingerprint sample of the at least one plurality of fingerprint samples, whether the respective fingerprint sample fulfills an inconsistency criterion, wherein the inconsistency criterion is based on the signal strength related value of the respective fingerprint sample and the estimated distance $d_i$ between the mobile device and the AP (communication node) associated with the fingerprint sample.

If the inconsistency criterion is fulfilled this may indicate that the respective fingerprint sample is considered to be inconsistent.

The inconsistency criterion may be fulfilled if a mismatch is detected between a signal strength representative obtained from the signal strength related value of the respective fingerprint sample and the distance value indicative of an estimated distance between the mobile device and the AP associated with this fingerprint sample.

For instance, the signal strength representative may represent a value of a power or an energy determinable based on the signal strength related value. The signal strength representative may indicate the strength of the signal received by the mobile device associated with this fingerprint sample, e.g. by means of a value of power or of a value of energy of the signal received by the mobile device. Or, as another example, the signal strength representative may indicate a signal strength difference between the signal strength of the signal received by the mobile device associated with this fingerprint at the position and the transmission signal strength of the AP associated with this fingerprint sample. Thus, the signal strength representative may represent a value of a difference between a value of power of the signal received by the mobile device and a value of transmission power of the AP associated with this fingerprint sample, or, the signal strength representative may represent a value of a difference between a value of energy of the signal received by the mobile device and a value of energy of the signal transmitted by the AP associated with this fingerprint sample.

As an example, a mismatch may be detected with respect to a fingerprint sample if the signal strength value, which may be denoted as $RSS_i$, wherein subscript i indicates the ith fingerprint sample of the at least one fingerprint sample, indicates that a strong signal is received, and the distance value indicative of an estimated distance between the mobile device and the AP, wherein the distance value may be denoted as $d_i$, indicates that the position of the measurement of the signal strength value is far from the position of the respective AP associated with this fingerprint sample. In this case, the fingerprint sample may be considered to fulfill the inconsistency criterion, since it is not reasonable to receive a strong signal although the distance from the measuring mobile device to the transmitting AP is far. Thus, assumptions about radio propagation modes may be applied with respect to the inconsistency criterion. For instance, the inconsistency criterion might consider the assumption that the radio signal strength must decay over distance, and that strong signals cannot be detected at large distance from the signal source.

For instance, the information that a fingerprint sample fulfills the inconsistency criterion might be used for generating and/or amendment of radio model data. For instance, a fingerprint sample that fulfills the inconsistency criterion might be considered to have a wrong location and might be discarded or might be further processesed for further investigation. A radio model could be for instance a radio model for a particular AP that is defined by values of a limited set of parameters. Such a radio model may be for instance in the form of an equation or a set of equations including the values of the parameters.

Alternatively, a radio model could be for instance a radio map, which comprises signal strength values for a plurality of APs mapped to a respective grid point of a grid, the grid points representing geographical locations of a particular site. The radio model may be any kind of model that is defined by values of a limited set of parameters and that enables an estimation of a position of a mobile device based on RSS measurements of the mobile device on matching WLAN access points. By way of example, it is assumed that the radio model is a path loss model, which is defined by an estimation of the location of the WLAN access point, an estimation of an apparent transmission power used by the WLAN access point for transmitting signals and an estimated path loss exponent. The parameter values for each radio model could be estimated for example using a standard radio signal propagation model and the Gauss-Newton algorithm for a non-linear fitting problem.

Further example operations in the system of FIG. 3 or FIG. 4 will now be described with reference to FIG. 6, wherein actions in FIG. 6 may be used for performing action 504 in FIG. 5.

In the case of FIG. 4, processor 401 and some of the program code stored in memory 402 may cause server 400 of FIG. 4 to perform the presented actions when program code is retrieved from memory 402 and executed by processor 401. The same operations could be performed by mobile device 310 of FIG. 3.

For each of the at least one access point (i.e., at least one communication node), a value related to the signal strength of the respective AP is determined. (action 601).

As an example, this value related to the signal strength may represent a transmission power of the respective access point or a value being indicative of the transmission power of the respective AP.

As an example, the signal transmitted by an access point, which is received by a mobile device for obtaining a fingerprint sample, may comprise an indication of a transmission power used by the AP. This may be the case, if the transmission power do not have to be estimated but are known, for example based on information from the operator of the AP. For instance, the indication of the signal strength related value of the signal transmitted by the AP comprises an indication of one of an estimated transmission power and an estimated apparent transmission power. This may have the effect that if an estimated apparent transmission power is determined anyhow as parameters of a parametric radio model, there is no need to determine and store additional values for each AP. The apparent transmission power is to be understood to be the estimated received signal power at a distance to the location of the AP, for example at a distance of 1 meter. In certain embodiments, the indication of the signal strength related value of the signal transmitted by the AP may comprise an indication of the strongest received signal strength. This may have the effect that such values are regularly available in fingerprints that may be used for generating radio model data. If such values are stored for each AP, they may be used with any kind of radio model, for instance for parametric radio models and for radio maps. Furthermore, such values may have the effect that they may be suited to reflect the situation at a particular site particularly well. The indication of a received signal strength may be for instance a received signal strength indicator (RSSI) or a physical Rx level in dBm with a reference value of 1 mW, etc. Summarized, information on a transmission power used by the APs can be based for example on observed signals and locations directly from fingerprints, on radio models that have been created using fingerprints and/or on information from an operator who knows the actual location and transmission power.

Furthermore, as another example, the value related to the signal strength of the transmitted signal of the AP associated with the respective fingerprint sample may be estimated. For instance, the value related to the signal strength of the transmitted signal of the AP associated with the respective fingerprint may represent an estimated transmission power or an estimated apparent transmission power of the AP. The value related to the signal strength of the transmitted signal of the AP may be represented by $ATX_{CN}$, wherein CN denotes the AP.

Then, for each fingerprint sample of the at least one plurality of fingerprint samples a value related to a path loss associated with respective fingerprint sample is determined.

Determining a value related to a path loss associated with the respective fingerprint sample can be performed based on the signal strength related value $RSS_i$ of the fingerprint sample and the distance value $d_i$ indicative of an estimated distance between the mobile device and the AP associated with the fingerprint sample.

Furthermore, the value related to a path loss associated with the respective fingerprint sample may be further determined based on the estimated transmission value related to the signal strength of the transmitted signal of the AP associated with the respective fingerprint sample, wherein, as an example the representation of a difference between the signal strength related value of the respective fingerprint sample and the value related to the signal strength of the transmitted signal of the APs associated with the respective fingerprint sample I, which may be calculated as $$Dpow_i = RSS_i - ATX_{CN},$$

may be used for determining value related to a path loss associated with the respective fingerprint sample.

For instance, the value related to a path loss associated with the respective fingerprint sample may represent a path loss exponent $n_i$, wherein subscript i may denote the respective ith fingerprint sample associated with this a path loss exponent $n_i$, wherein the a path loss exponent $n_i$, may be calculated as:

$$n_i = \frac{Dpow_i}{-10 \log_{10}(d_i)},$$

wherein $RSS_i$ and $ATX_{CN}$ in $Dpow_i$ may represent the received and transmitted powers in dBm, and $d_i$ may represent the distance between the estimated location of the fingerprint sample and the respective AP in meters. It has to be understood that different ways for calculating the path loss exponent $n_i$ may be applied.

It is checked whether the determined value related to a pass loss of the fingerprint is below a path loss threshold such that the respective fingerprint sample is determined to fulfill the inconsistency criterion if the determined value related to a pass loss is below the pass loss threshold. (action 603) As an example, the inconsistency criterion might be understood as a consistency criterion, wherein the consistency criterion is assumed to be not fulfilled if the determined value related to a pass loss of the fingerprint is below a path loss threshold. If the determined value related to a pass loss is below the path loss threshold this may indicate that the power or energy of the received signal when obtaining this fingerprint sample does not match with the estimated distance $d_i$ between the estimated location of the fingerprint sample and the respective AP and thus this fingerprint sample may be considered to be inconsistent, i.e., to be wrong, e.g. having a wrong location information and/or a wrong signal strength related value.

It may be considered that path loss exponents have physical limitations, wherein the path loss threshold may be selected based on the physical limitation in a specific scenario, wherein the path loss threshold is selected to be lower than the path loss exponent in the specific scenario. For instance, in case of line of sigh propagation, the lower limit of path loss is equal to 2 (or approximately equal to 2).

As an example, the path loss threshold may be set to 1, i.e., fingerprint samples being associated with a path loss exponent $n_i$, <1 may be considered to fulfill the inconsistency criterion. Of course, other well-suited path loss thresholds may be used, e.g. 0,7, or 0,8 or 0,9 or 1,1. For instance, the path loss threshold may be between 0,5 and 1,5, in particular between 0,8 and 1,2.

Thus, method 600 may be applied in order to perform action 504 in FIG. 5.

Example operations in the system of FIG. 3 or FIG. 4 will now be described with reference to FIG. 7, wherein actions in FIG. 7 may be used for performing action 504 in FIG. 5 and/or for performing action 601 in FIG. 6.

In the case of FIG. 4, processor 401 and some of the program code stored in memory 402 may cause server 400 of FIG. 4 to perform the presented actions when program code is retrieved from memory 402 and executed by processor 401. The same operations could be performed by mobile device 310 of FIG. 3.

For one or each of the at least one access point (i.e., at least communication node), determine the maximum value of a set of signal strength related values associated with the same AP (i.e., communication node) is determined. (action 701).

The set of one or more signal strength related values associated with this AP are obtained from respective one or more fingerprint samples all associated with this AP. For instance, if there is a set of M fingerprint samples associated with this AP, with M an integer and M≥1, the maximum value of the set of n signal strength related values associated with this communication node may be represented by $RSS_{max} = \max(RSS_i)$, with $i \in \{1 \ldots M\}$.

Furthermore, a value related to the altitude of the AP may be estimated. (action 702)

The estimated value related to the altitude of the AP may be determined based on the estimated height of the AP above a floor, and, for example, additionally based on floor information at which the AP is positioned. For instance, this floor information may be indicative of the floor level and this floor level may be used for estimating the height of the AP above a floor. As an example, floor information may be included in the signal transmitted by the AP such that it can be received by the measuring mobile device when obtaining a fingerprint sample associated with this AP, or, as an alternative, this floor information may be stored in a database, e.g. the previously mentioned database, and may be associated with the AP identifier of the respective AP. Thus, as an example, based on an optionally received AP identifier the floor information may be obtained from this database. For instance, each of at least one fingerprint sample may comprise such a floor information, which might represent a floor level indicator $fID_i$ that indicates the level of the floor of the AP associated with the respective fingerprint sample, wherein subscript i denotes the respective fingerprint sample.

For instance, based on a set of M fingerprint samples associated with the same AP, wherein each of the M fingerprint samples comprises a floor level indicator $fID_i$, and under assumption that the above mentioned weighting values $w_i$ have been determined, the estimated floor level indicator may be calculated as:

$$fID = \text{round}\left(\sum_{i=1}^{M} w_i \cdot fID_i\right).$$

For instance, said fID may be estimated for each AP of the at least one AP.

As an example, the height $h_{CN}$ of a AP above a floor may be estimated as the minimum of $$h = 10^{\frac{(-ATX_{DEF} - \max(RSS_i))}{-10 \cdot NLOS_{DEF}}},$$

wherein $ATX_{DEF}$ represents a default apparent transmission power of this AP and $NLOS_{DEF}$ represents a default path loss related value, and the height of the floor at which the AP is located: $h_{CN}$=min (h, floorHeight$_{fID}$). The height of the floor floorHeight$_{fID}$ may be obtained based on the floor level indicator fID and the above mentioned database. Thus, as an example, the value floorHeight$_{jID}$ indicates the height of the floor at level fID.

For instance, this height $h_{CN}$ of a AP above a floor may be considered to represent the estimated value related to the altitude of the AP or may be considered to represent the estimated value related to the relative altitude of the AP above the height of a corresponding floor level of the AP.

Then, the value related to the signal strength of the transmitted signal of the AP is determined based on the maximum value of a set of one or more signal strength related values associated with this AP, i.e. $RSS_{max}$=max $(RSS_i)$, with $i \in \{1 \ldots M\}$, and based on the estimated value related to the altitude of the AP, which might be represented by $h_{CN}$, e.g. by means of considering a path loss model with respect to the estimated value related to the altitude of the AP. For instance, the value related to the signal strength of the transmitted signal of the AP associated with the respective fingerprint sample at the AP may represent the apparent transmission power $ATX_{CN}$ of the AP and might be estimated as:

$$ATX_{CN}=\max(RSS_i)+NLOS_{DEF}\cdot 10\,\log_{10}(h_{CN})$$

For instance, actions 701, 702 and 703 may be performed for each AP of the at least one AP.

This apparent transmission power $ATX_{CN}$ of the AP may be used for determining the value related to a path loss of a respective fingerprint sample of the at least one plurality of fingerprint samples.

For instance, said fID may be estimated for each AP of the at least one AP.

Further example operations in the system of FIG. 3 or FIG. 4 will now be described with reference to FIGS. 8a and 8b, wherein actions in FIGS. 8a and 8b may be applied after it has been determined, for each fingerprint sample of one plurality (or each plurality) of the at least one plurality of fingerprint samples, whether the respective fingerprint sample fulfills the inconsistency criterion, e.g. as performed by action 504. For instance, this further example operation described with reference to FIGS. 8a and 8b might be considered to represent a separate aspect of the invention, i.e., being separate from the actions described with respect to FIGS. 5 to 7.

For a plurality of fingerprint samples of the at least one plurality of fingerprint samples the number of fingerprint samples that fulfill the inconsistency criterion is determined, e.g. by means of counting the fingerprint samples that fulfill the inconsistency criterion. (action 801)

For instance, a plurality of fingerprint samples of the at least one plurality of fingerprint samples may represent fingerprint samples associated with the same connection node or may represent fingerprint samples associated with the same floor or same tile of a building or may represent fingerprint samples associated with a same area. Or, as an example, a plurality of fingerprint samples of the at least one fingerprint sample may represent fingerprint samples collected by the same user and/or collected by the same mobile device. Or, for instance, a plurality of fingerprint samples of the at least one fingerprint sample may represent fingerprint samples collected in a specific time frame.

It is checked whether the number of determined fingerprint samples that fulfill the inconsistency criterion is below the number threshold. (action 802). If this is true, this may be considered to indicate that the quality of the respective plurality of fingerprint samples of the at least one plurality of fingerprint samples is good. Thus, in this case, the respective plurality of fingerprint samples may be accepted for further processing, e.g. to be used for a radio map, wherein this radio map may be applied for indoor positioning. (action 803)

If the number of determined fingerprint samples that fulfill the inconsistency criterion is not below the number threshold this may be considered to indicate that too many fingerprint sample in this plurality of fingerprint samples of the at least one plurality of fingerprint samples are inconsistent and thus, a further processing may be necessary with at least some of the fingerprint samples of this plurality of fingerprint samples, wherein said further processing may comprise a further checking of validity of those fingerprint samples considered to be inconsistent.

The number threshold may represent a first threshold. In case that said checking whether the number of determined fingerprint samples that fulfill the inconsistency criterion is below the first number threshold yields in a negative result, it may be proceeded with: checking whether the number of determined fingerprint samples that fulfill the inconsistency criterion is below a second number threshold. (action 804)

For instance, if the number of the determined fingerprint samples that fulfill the inconsistency criterion is not below the second number threshold, i.e., in case that said checking whether the number of determined fingerprint samples is below the second number threshold yields in a negative result, the respective plurality of fingerprint samples of the at least one plurality of fingerprint samples may be considered to be of poor quality and the respective plurality of fingerprint samples may be discarded, i.e., not used for a radio map and for positioning, or, as an example, more than one fingerprint sample of the respective plurality of fingerprint samples may be discarded. (action 805)

In case that said checking whether the number of determined fingerprint samples is below the second number threshold yields in a positive result, at least one fingerprint sample from the plurality of fingerprint samples may for instance be removed in order to obtain an amended plurality of fingerprint sample. (optional action 807) However, it is noted that action 807 represents an optional action. For instance, it may happen that none of the fingerprint samples has to be deleted, e.g. when inconsistency criterion failed marked correct fingerprint samples as inconsistent. Thus, it might be checked whether at least one fingerprint sample has to be removed, e.g. based on visualizing fingerprint samples of the plurality of fingerprint samples (optional action 806) and based on a user input. Thus, a user might decide whether at least one fingerprint sample has to be deleted or not.

For instance, fingerprint samples of the respective plurality of fingerprint sample of the at least one plurality of fingerprint samples that fulfill the inconsistency criterion may be considered to represent a set of fingerprint samples. The set of fingerprint samples may comprise any fingerprint samples of the respective plurality of fingerprint sample that fulfill the inconsistency criterion or one or more fingerprint samples of the respective plurality of fingerprint sample that fulfill the inconsistency criterion.

Said removed at least one fingerprint sample may be of this set of fingerprint samples. For instance, this removing may be performed based on an algorithm that checks the validity of the fingerprint samples of the set of fingerprint samples. Then, the remaining fingerprint samples of the plurality of fingerprint samples may be used for further processing, e.g. be used for a radio map, wherein this radio map may be applied for indoor positioning.

Furthermore, said removing may be performed in response to a command, e.g. received from a user interaction. For instance, (i) a signal representation comprising information on at least one fingerprint sample that fulfills the inconsistency criterion of at least one plurality of fingerprint samples of the at least one plurality of fingerprint samples may be generated, (ii) a said signal representation may be provided at an output interface, and (iii) a signal representation comprising information on at least one selected fingerprint sample of said at least one fingerprint sample that fulfills the inconsistency criterion at an input interface may be received, wherein this signal representation may represent the command for removing.

For instance, the at least one fingerprint sample that fulfills the inconsistency criterion may be visualized on a display. (optional action 806) As an example, if action 806 is performed by mobile device 300, this display may represent 308. Or, as another example, if action 806 is performed by server 400, this display may represent a display of this server 400 or a display connected to this server 400, e.g. via a network like the internet 420 or another network.

Thus, as an example, the at least one fingerprint sample that fulfills the inconsistency criterion of the respective plurality of fingerprint samples can be visualized on a display and thus may be presented to a user for further investigation. For instance, the at least one fingerprint sample that fulfills the inconsistency criterion may be visualized on a kind of map shown on the display, wherein a fingerprint sample of this at least one fingerprint sample may be shown on a position in this map according to the location information being indicative of the particular position where the mobile device performed the measurement associated with this fingerprint sample. Furthermore, as an example, further information may be displayed on the display, e.g. an indicator of the signal strength related value of the respective fingerprint sample.

Furthermore, as an example, said visualizing fingerprint samples may comprise visualizing at least one further fingerprint sample of the at least one plurality of fingerprint samples on the display.

For instance, said at least one further fingerprint sample may be of the same plurality of fingerprint samples as the at least one fingerprint sample that fulfills the inconsistency criterion. As an example, all fingerprint samples or a subset of fingerprint samples of the respective plurality of fingerprint samples may be visualized on the display. Furthermore, as an example, the at least one fingerprint sample that fulfill the inconsistency criterion may be indicated on the display such that a user can see which fingerprint samples of the respective plurality of fingerprint samples are considered to be inconsistent.

Figure 9A:
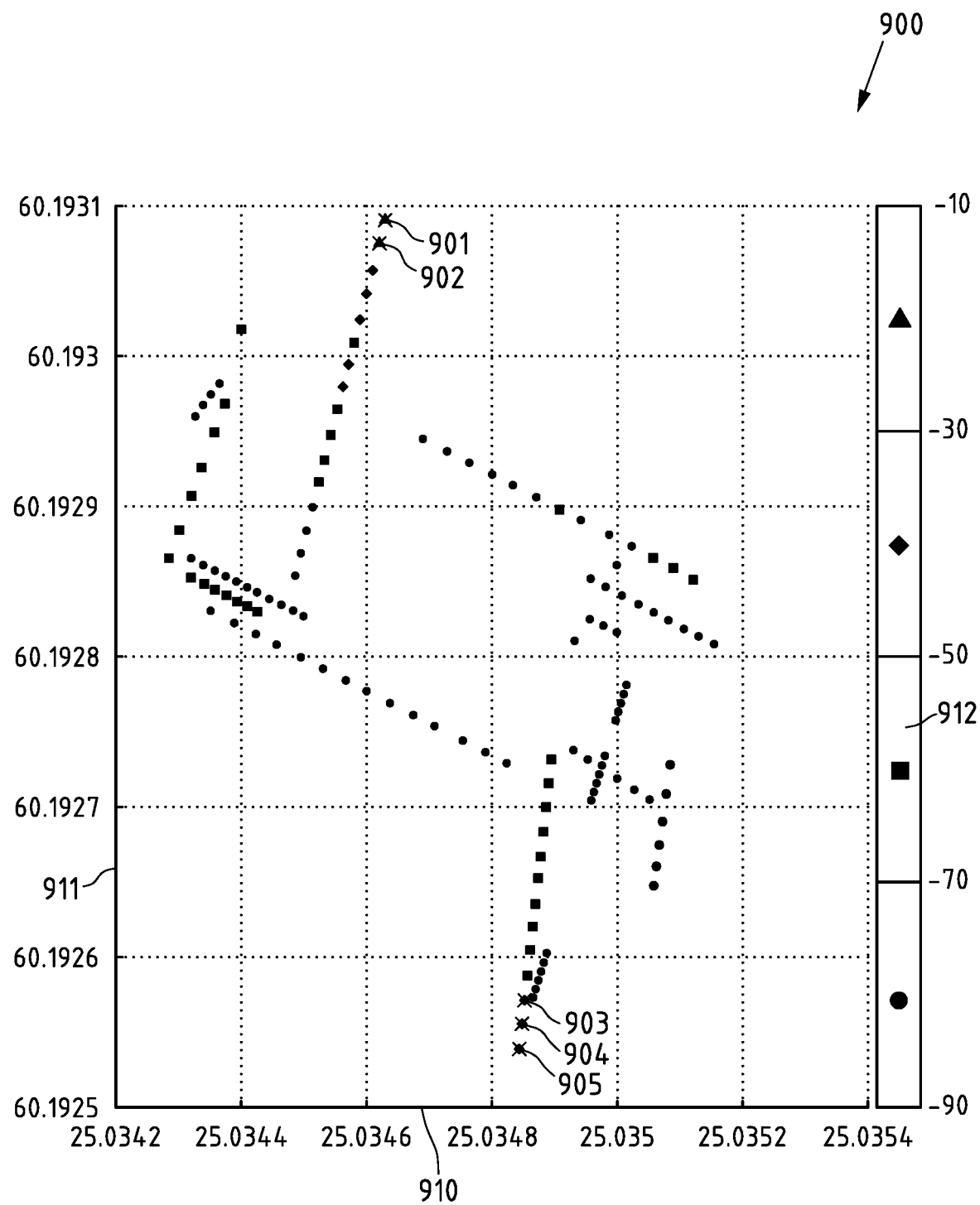
FIGS. 9a/9b schematically illustrates examples of a visualized plurality of fingerprint samples as may be used with respect to fourth example operations in the system of FIG. 3 or 4.
Figure 9B:
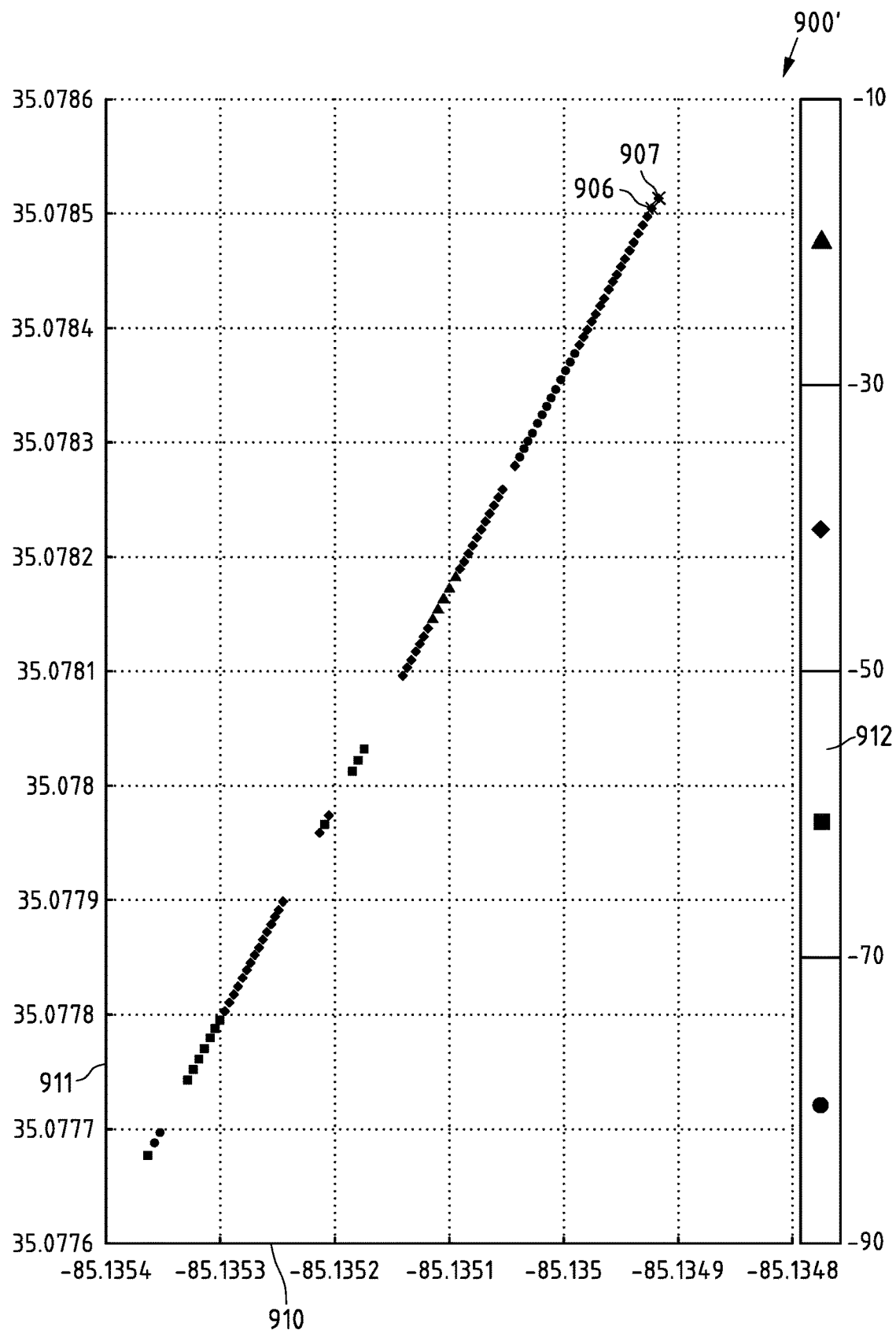

FIGS. 9a and 9b depict examples of visualization of a plurality of fingerprint samples, wherein fingerprint samples having a crossed edge represent fingerprint samples that fulfill the inconsistency criterion. As an example, fingerprint samples 901, 902, 903, 904, 905, 906, 907 fulfill the inconsistency criterion and thus may be highlighted in visualization, whereas the remaining fingerprint samples are not highlighted. Furthermore, such a visualization 900, 900' may comprise a map having a first direction (e.g. longitude) 910 and a second direction being different from the first direction (e.g. latitude) 911, wherein the fingerprint samples are shown at respective positions on this map.

Furthermore, as an example, the RSS value of each fingerprint sample may be indicated by a respective color, as indicated by reference sign 912. Thus, a user may see from the color of the fingerprint sample whether this is a fingerprint sample having a high RSS value or a low RSS value.

Thus, a user may use this visualization performed in action 806 in order to check which at least one fingerprint sample may be selected for removal, and then this removal is performed in action 807 based on a user interaction via an input interface, e.g., in case that the display for visualization is a touch screen, by means of touching the respective fingerprint sample to be removed on the display. For instance, actions 806 and 807 may be performed several times in order to remove more than one fingerprint sample from the plurality of fingerprint samples, wherein in action 806 the updated visualization may depicted, i.e. without depicting a removed fingerprint sample of the respective plurality of fingerprint samples anymore. The remaining fingerprint samples of the plurality of fingerprint samples that have not been removed may be considered to represent an amended plurality of fingerprint samples.

Furthermore, under the assumption that the at least one plurality of fingerprint samples are several pluralities of fingerprint samples, this visualization in action 806 may be performed for at least two different pluralities of fingerprint samples of the several pluralities of fingerprint samples. Thus, the user may investigate how consistent fingerprint samples are between different pluralities of fingerprint samples, and such may detected which of them are correct and which of them are not. For instance, the different pluralities of fingerprint samples may be visualized on the display separately one by one, such that the user can see the difference between different pluralities of fingerprint samples.

Figure 8A:
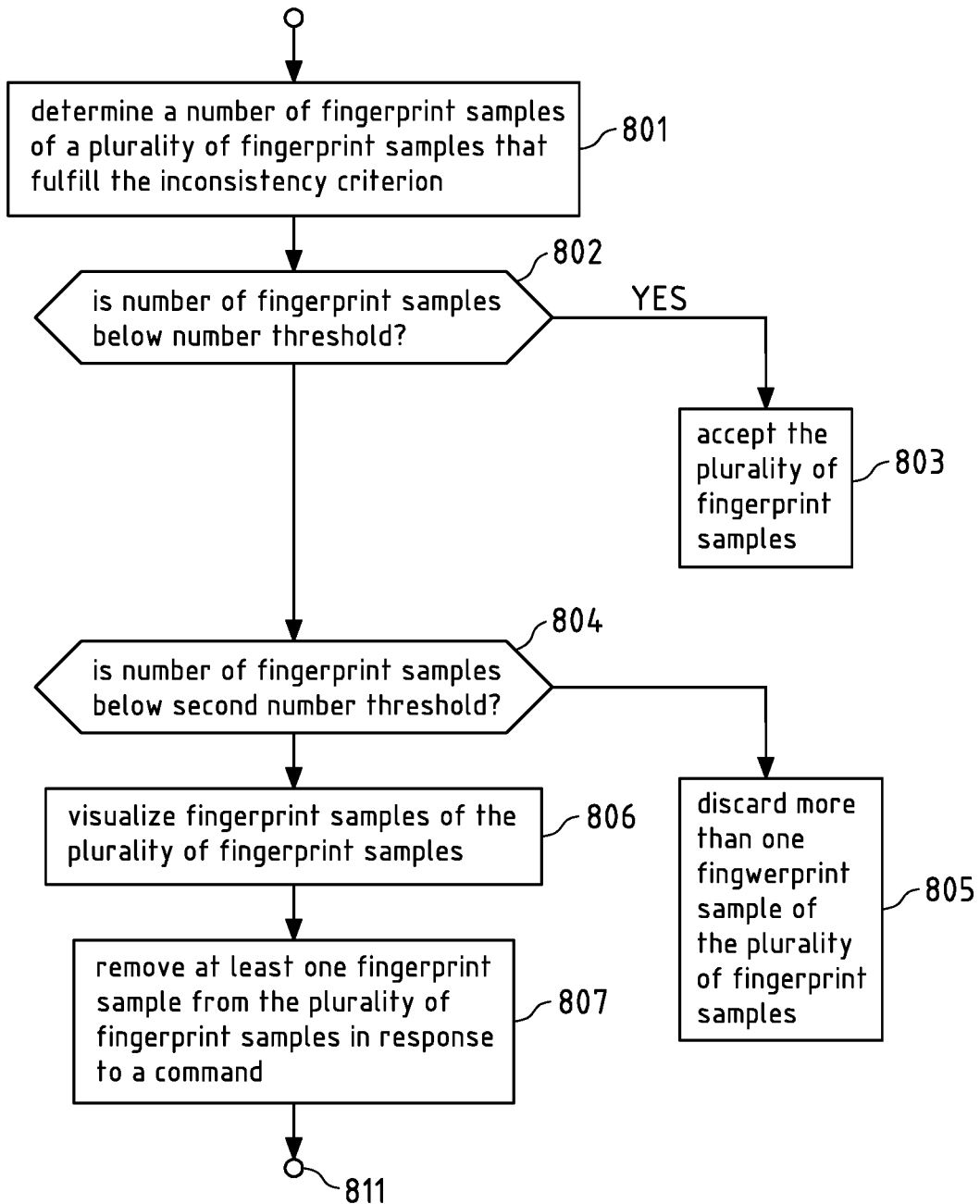
FIGS. 8a/8b is a flow chart illustrating fourth example operations in the system of FIG. 3 or 4.
Figure 8B:
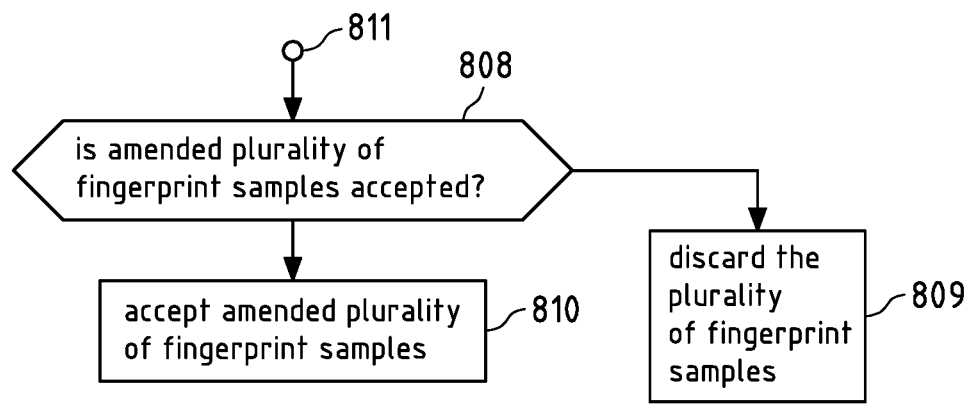

Reference sign 811 in FIGS. 8a and 8b indicates that action 808 may be performed after action 806 or action 807.

It may be checked whether the amended plurality of fingerprint samples is accepted. (action 808) For instance, it checked whether a command is received, e.g. via the input interface, whether the amended plurality of fingerprint samples is accepted. As an example, said signal representation comprising information on at least one selected fingerprint sample may comprise information on discarding a selected plurality of fingerprint samples of the at least one plurality of fingerprint samples. Thus, a user input can be performed via the input interface in order to accept or discard the amended plurality of fingerprint samples.

In case the amended plurality of fingerprint samples is accepted, this amended plurality of fingerprint samples can be used for positioning purposes. (action 810). Otherwise, the amended plurality of fingerprint samples is discarded. (action 811).

Furthermore, it has to be understood that actions 807-810 may represent optional actions. For instance, a user may decide to discard a whole plurality of fingerprint samples without removing selected fingerprint samples. In this case, a respective user command for discarding a plurality of fingerprint samples may be received via the input interface, e.g., after the respective plurality of fingerprint samples has been visualized in action 806. Thus, as an example, discarding a plurality of fingerprint samples may be performed in case that said signal representation comprising information on at least one selected fingerprint sample comprises information on discarding a selected plurality of fingerprint samples of the at least one plurality of fingerprint samples.

For instance, a user may select the at least one selected fingerprint sample or a plurality of the fingerprint samples to be discarded, e.g. by means of an input interface. Accordingly, the user may use the information provided by the visualization on the display in order to select at least one fingerprint sample to be discarded. As an example, the user may select all fingerprint samples of a respective plurality of fingerprint samples to be discarded, and thus this respective plurality of fingerprint samples may not be used for further processing, e.g. not used for generating radio model data. Or, as another example, the user may select a subset of fingerprint samples of the respective plurality of fingerprint sample to be discarded, e.g. by choosing fingerprint samples of the tile, floor or time frame as inconsistent fingerprint.

The proposed methods may enable automatic detection of wrong fingerprint samples, i.e. of wrong fingerprint data that possibly have wrong location. Furthermore, the proposed methods may be used during collection phase to indicate if some of the fingerprints are inconsistent, and may prevent further incorrect data collection. The Proposed methods may be used a first mean to find a root cause of poor positioning accuracy.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 10:
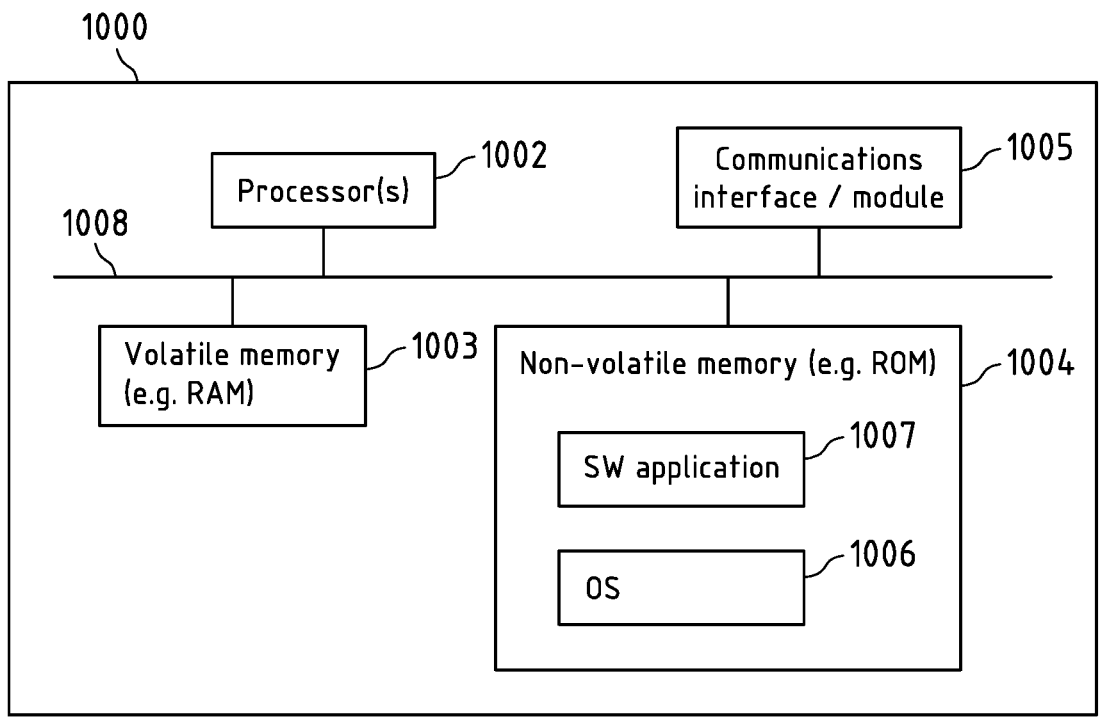
FIG. 10 is a schematic block diagram of an example embodiment of an apparatus.
Figure 11:
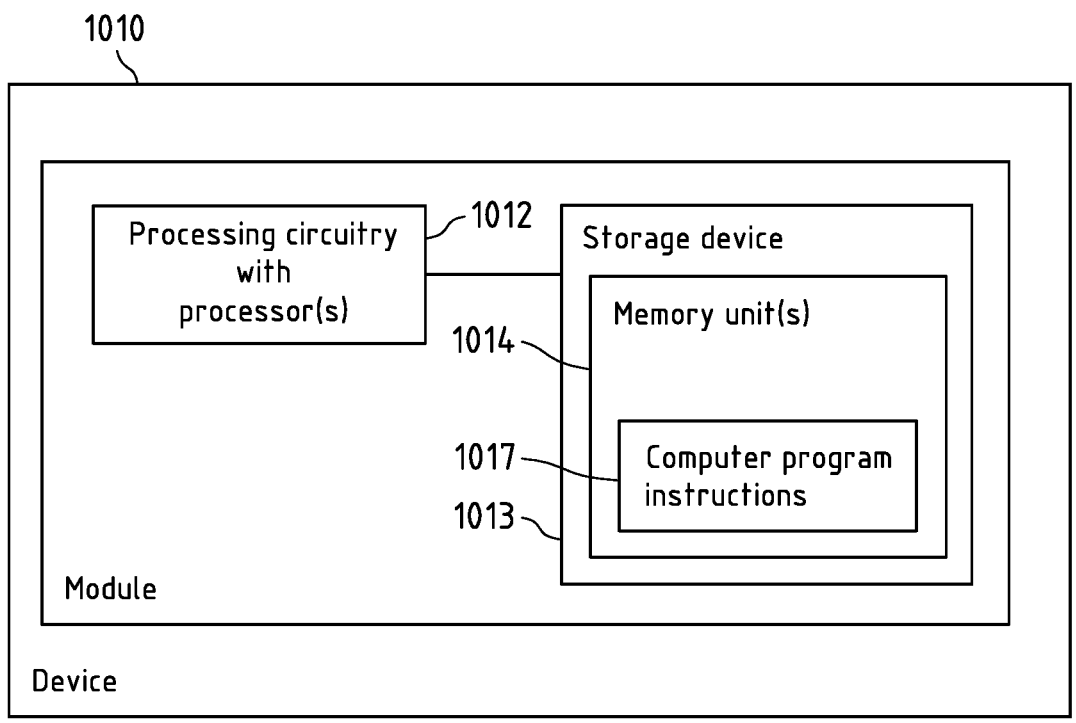
FIG. 11 is a schematic block diagram of an example embodiment of an apparatus.
Figure 12:
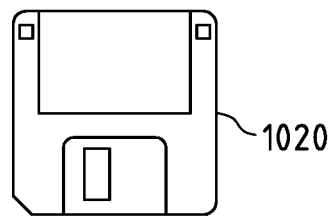
FIG. 12 schematically illustrates example removable storage devices.
Figure 12:
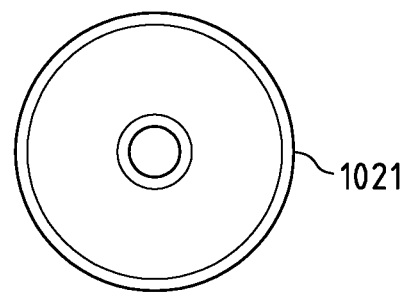
Figure 12:
Figure 12:
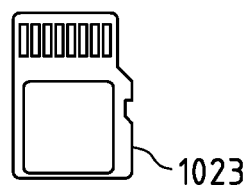

Example embodiments using at least one processor and at least one memory as a non-transitory data medium are shown in FIGS. 10 and 11.

FIG. 10 is a schematic block diagram of a device 1000. Device 1000 includes a processor 1002. Processor 1002 is connected to a volatile memory 1003, such as a RAM, by a bus 10010. Bus 10010 also connects processor 1002 and RAM 1003 to a non-volatile memory 1004, such as a ROM. A communications interface or module 1005 is coupled to bus 10010, and thus also to processor 1002 and memories 1003, 1004. Within ROM 1004 is stored a software (SW) application 1007. Software application 1007 may be a positioning application, although it may take some other form as well. An operating system (OS) 1006 also is stored in ROM 1004.

FIG. 11 is a schematic block diagram of a device 1010. Device 1010 may take any suitable form. Generally speaking, device 1010 may comprise processing circuitry 1012, including one or more processors, and a storage device 1013 comprising a single memory unit or a plurality of memory units 1014. Storage device 1013 may store computer program instructions 1017 that, when loaded into processing circuitry 1012, control the operation of device 1010. Generally speaking, also a module 1011 of device 1010 may comprise processing circuitry 1012, including one or more processors, and storage device 1013 comprising a single memory unit or a plurality of memory units 1014. Storage device 1013 may store computer program instructions 1017 that, when loaded into processing circuitry 1012, control the operation of module 1011.

The software application 1007 of FIG. 10 and the computer program instructions 1017 of FIG. 11, respectively, may correspond e.g. to the computer program code in any of memories 102, 302 or 402, respectively.

In example embodiments, any non-transitory computer readable medium mentioned in this text could also be a removable/portable storage or a part of a removable/portable storage instead of an integrated storage. Example embodiments of such a removable storage are illustrated in FIG. 10, which presents, from top to bottom, schematic diagrams of a magnetic disc storage 1020, of an optical disc storage 1021, of a semiconductor memory circuit device storage 1022 and of a Micro-SD semiconductor memory card storage 1023.

The functions illustrated by processor 101 in combination with memory 102, or processor 301 in combination with memory 302, or the integrated circuit 304, or processor 401 in combination with memory 402, or the chip 404 can also be viewed as means for obtaining results of measurements for a plurality of communication nodes, the measurements performed by a mobile device at a particular position on signals of the communication nodes and the measurement results for each of the communication nodes including at least a signal strength related value and an identification of the communication node; means for obtaining for at least one of the plurality of communication nodes a stored indication of a location and a stored signal strength related value associated with the stored indication of a location, and determining for the at least one communication node a difference between the signal strength related value included in the results of measurements for the at least one communication node and the stored signal strength related value obtained for the at least one communication node; means for obtaining for at least a part of the plurality of communication nodes stored radio model data, and estimating the particular position of the mobile device based on the obtained results of measurements for at least a part of the plurality of communication nodes and on the obtained stored radio model data; and means for determining a distance between the estimated particular position and a location indicated by the obtained stored indication of a location for the at least one communication node, as an indication of a health state of stored radio model data, in the case that the determined difference between the signal strength related value included in the results of measurements for the at least one communication node and the stored signal strength related value obtained for the at least one communication node falls short of a threshold.

The program codes in memories 102, 302 and 402 can also be viewed as comprising such means in the form of functional modules.

FIGS. 2, 5, 6, 7, 8*a* and 8*b* may also be understood to represent example functional blocks of computer program codes supporting determining for at least one fingerprint sample whether it fulfills the inconsistency criterion.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
   obtaining at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value;
   determining, for at least one fingerprint sample of the at least one fingerprint sample, whether the respective fingerprint sample fulfils an inconsistency criterion, wherein the inconsistency criterion is based on the signal strength related value of the respective fingerprint sample and a distance value indicative of an estimated distance between the mobile device and the communication node associated with the fingerprint sample; and
   determining a value related to a signal strength of a transmitted signal of the communication node associated with the respective fingerprint sample at the communication node based on:
      a maximum value of a set of one or more signal strength related values associated with the communication node; and
      an estimated value related to an altitude of the communication node,
   wherein the inconsistency criterion is further based on the value related to the signal strength of the transmitted signal of the communication node associated with the respective fingerprint sample at the communication node.

2. The method according to claim 1, wherein said results of a measurement performed by a mobile device at a particular position associated with a respective fingerprint sample of the at least one fingerprint sample comprise location information being indicative of the particular position where the mobile device performed the measurement associated with this fingerprint sample.

3. The method according to claim 2, comprising, for each fingerprint sample of the at least one fingerprint sample, estimating the location information associated with the respective fingerprint sample based on the measurement performed by the mobile device at the particular position of this fingerprint sample.

4. The method according to claim 2, comprising, for each fingerprint sample of the at least one fingerprint sample for which the inconsistency criterion is determined, estimating the distance between the mobile and the communication node associated with the respective fingerprint sample based on the location information of the respective fingerprint sample and a location information of the respective communication node.

5. The method according to claim 4, comprising estimating the location information of the respective communication node based on the location information of a plurality of fingerprint samples being associated with this communication node.

6. The method according to claim 5, comprising obtaining a weighting value for each fingerprint sample of the plurality of fingerprint samples being associated with this communication node, wherein a respective weighting value of a fingerprint sample of this plurality of fingerprint samples is determined based on the signal strength related value of the fingerprint sample.

7. The method according to claim 1, wherein the inconsistency criterion applied to a fingerprint sample of the at least one fingerprint information is based on a representation of a difference between the signal strength related value of the respective fingerprint sample and the value related to the signal strength of the transmitted signal of the communication nodes associated with the respective fingerprint sample.

8. The method according to claim 1, wherein said estimated value related to the altitude of the communication node is determined based on information on the height of a floor associated with this communication node.

9. The method according to claim 1, comprising, for each fingerprint sample of the at least one fingerprint information for which the inconsistency criterion is determined:
   determining a value related to a path loss associated with the respective fingerprint sample, and
   checking whether the determined value related to a pass loss is below a path loss threshold such that the respective fingerprint sample is determined to fulfil the inconsistency criterion if the determined value related to a pass loss is below the pass loss threshold.

10. The method according to claim 9, wherein the value related to a path loss associated with a respective fingerprint sample is determined based on the signal strength related value of the fingerprint sample and the distance value indicative of an estimated distance between the mobile device and the communication node associated with the fingerprint sample.

11. The method according to claim 1, wherein said determining, for at least one fingerprint sample of the at least one fingerprint sample, whether the respective fingerprint sample fulfils an inconsistency criterion, is performed for at least one plurality of fingerprint samples, the method comprising, for each plurality of fingerprint samples of the at least one plurality of fingerprint samples:
   determining a number of fingerprint samples that fulfil the inconsistency criterion; and checking whether the number of determined fingerprint samples that fulfil the inconsistency criterion is below a number threshold.

12. The method according to claim 11, wherein said number threshold represents a first number threshold, the method comprising, in case that said checking whether the number of determined fingerprint samples that fulfil the inconsistency criterion is below a first number threshold yields in a negative result:
checking whether the number of determined fingerprint samples that fulfil the inconsistency criterion is below a second number threshold.

13. The method according to claim 12, comprising, in case that said checking whether the number of determined fingerprint samples is below the second number threshold yields in a negative result, discarding more than one fingerprint sample of the respective plurality of fingerprint samples.

14. The method according to claim 12, comprising, in case that said checking whether the number of determined fingerprint samples is below the second number threshold yields in a positive result, removing at least one fingerprint sample from the plurality of fingerprint samples.

15. The method according to claim 12, comprising, in case that said checking whether the number of determined fingerprint samples is below the second number threshold yields in a positive result:
generating a signal representation comprising information on at least one fingerprint sample that fulfils the inconsistency criterion of at least one plurality of fingerprint samples of the at least one plurality of fingerprint samples,
providing said signal representation at an output interface,
receiving a signal representation comprising information on at least one selected fingerprint sample of said at least one fingerprint sample that fulfils the inconsistency criterion or comprising information that said at least one fingerprint sample is to be accepted at an input interface.

16. The method according to claim 15, comprising visualizing the at least one fingerprint sample that fulfils the inconsistency criterion on a display.

17. The method according to claim 16, comprising visualizing at least one further fingerprint sample of the at least one plurality of fingerprint samples on the display.

18. The method according to claim 15, wherein said signal representation comprising information on at least one selected fingerprint sample further comprises information on discarding a selected plurality of fingerprint samples of the at least one plurality of fingerprint samples.

19. The method according to claim 15, comprising discarding the plurality of fingerprint samples in case said signal representation comprising information on at least one selected fingerprint sample comprises information on discarding a selected plurality of fingerprint samples of the at least one plurality of fingerprint samples.

20. The method according to claim 15, wherein said signal presentation comprises information on at least one selected fingerprint sample is received based on a user interaction with an input device.

21. The method according to claim 1, wherein the at least one communication node comprises at least one module of the following module set: at least one terrestrial non-cellular transmitter; at least one access point of at least one wireless local area network; at least one Bluetooth transmitter; and at least one Bluetooth low energy transmitter.

22. The method according to claim 1, wherein the at least one apparatus is or belongs to the at least one mobile device or a server that is configured to obtain results of measurements for a plurality of communication nodes from mobile devices.

23. An apparatus comprising at least one processor and at least one memory including computer program code, the at least one memory and the computer program code configured to, with the at least one processor, cause the apparatus at least to perform:
obtain at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value;
determine, for at least one fingerprint sample of the at least one fingerprint sample, whether the respective fingerprint sample fulfils an inconsistency criterion, wherein the inconsistency criterion is based on the signal strength related value of the respective fingerprint sample and a distance value indicative of an estimated distance between the mobile device and the communication node associated with the fingerprint sample; and
determine a value related to a signal strength of a transmitted signal of the communication node associated with the respective fingerprint sample at the communication node based on:
a maximum value of a set of one or more signal strength related values associated with the communication node; and
an estimated value related to an altitude of the communication node,
wherein the inconsistency criterion is further based on the value related to the signal strength of the transmitted signal of the communication node associated with the respective fingerprint sample at the communication node.

24. The apparatus according to claim 23, wherein said results of a measurement performed by a mobile device at a particular position associated with a respective fingerprint sample of the at least one fingerprint sample comprise location information being indicative of the particular position where the mobile device performed the measurement associated with this fingerprint sample.

25. The apparatus according to claim 24, wherein the at least one memory and the computer program code are configured to, with the at least one processor, cause the apparatus to, for each fingerprint sample of the at least one fingerprint sample, estimate the location information associated with the respective fingerprint sample based on the measurement performed by the mobile device at the particular position of this fingerprint sample.

26. The apparatus according to claim 24, wherein the at least one memory and the computer program code are configured to, with the at least one processor, cause the apparatus to, for each fingerprint sample of the at least one fingerprint sample for which the inconsistency criterion is determined, estimate the distance between the mobile and the communication node associated with the respective fingerprint sample based on the location information of the respective fingerprint sample and a location information of the respective communication node.

27. The apparatus according to claim 26, wherein the at least one memory and the computer program code are configured to, with the at least one processor, cause the apparatus to estimate the location information of the respective communication node based on the location information of a plurality of fingerprint samples being associated with this communication node.

28. The apparatus according to claim 27, wherein the at least one memory and the computer program code are configured to, with the at least one processor, cause the apparatus to obtain a weighting value for each fingerprint sample of the plurality of fingerprint samples being associated with this communication node, wherein a respective weighting value of a fingerprint sample of this plurality of fingerprint samples is determined based on the signal strength related value of the fingerprint sample.

29. The apparatus according to claim 28, wherein the inconsistency criterion applied to a fingerprint sample of the at least one fingerprint information is based on a representation of a difference between the signal strength related value of the respective fingerprint sample and the value related to the signal strength of the transmitted signal of the communication nodes associated with the respective fingerprint sample.

30. The apparatus according to claim 23, wherein said estimated value related to the altitude of the communication node is determined based on information on the height of a floor associated with this communication node.

31. The apparatus according to claim 23, wherein the at least one memory and the computer program code are configured to, with the at least one processor, cause the apparatus to, for each fingerprint sample of the at least one fingerprint information for which the inconsistency criterion is determined:
  determine a value related to a path loss associated with the respective fingerprint sample, and
  check whether the determined value related to a pass loss is below a path loss threshold such that the respective fingerprint sample is determined to fulfil the inconsistency criterion if the determined value related to a pass loss is below the pass loss threshold.

32. The apparatus according to claim 31, wherein the value related to a path loss associated with a respective fingerprint sample is determined based on the signal strength related value of the fingerprint sample and the distance value indicative of an estimated distance between the mobile device and the communication node associated with the respective fingerprint sample.

33. The apparatus according to claim 23, wherein the at least one memory and the computer program code are configured to, with the at least one processor, cause the apparatus to perform said determining, for at least one fingerprint sample of the at least one fingerprint sample, whether the respective fingerprint sample fulfils an inconsistency criterion, for at least one plurality of fingerprint samples; wherein the at least one memory and the computer program code are configured to, with the at least one processor, cause the apparatus to, for each plurality of fingerprint samples of the at least one plurality of fingerprint samples:
  determine a number of fingerprint samples that fulfil the inconsistency criterion; and
  check whether the number of determined fingerprint samples that fulfil the inconsistency criterion is below a number threshold.

34. The apparatus according to claim 33, wherein said number threshold represents a first number threshold, wherein the at least one memory and the computer program code are configured to, with the at least one processor, cause the apparatus to, in case that said checking whether the number of determined fingerprint samples that fulfil the inconsistency criterion is below a first number threshold yields in a negative result:
  check whether the number of determined fingerprint samples that fulfil the inconsistency criterion is below a second number threshold.

35. The apparatus according to claim 34, wherein the at least one memory and the computer program code are configured to, with the at least one processor, cause the apparatus to, in case that said checking whether the number of determined fingerprint samples is below the second number threshold yields in a negative result, discard more than one fingerprint sample of the respective plurality of fingerprint samples.

36. The apparatus according to claim 34, wherein the at least one memory and the computer program code are configured to, with the at least one processor, cause the apparatus to, in case that said checking whether the number of determined fingerprint samples is below the second number threshold yields in a positive result, remove at least one fingerprint sample from the plurality of fingerprint samples.

37. The apparatus according to claim 34, wherein the at least one memory and the computer program code are configured to, with the at least one processor, cause the apparatus to, in case that said checking whether the number of determined fingerprint samples is below the second number threshold yields in a positive result:
  generate a signal representation comprising information on at least one fingerprint sample that fulfils the inconsistency criterion of at least one plurality of fingerprint samples of the at least one plurality of fingerprint samples,
  provide said signal representation at an output interface,
  receive a signal representation comprising information on at least one selected fingerprint sample of said at least one fingerprint sample that fulfils the inconsistency criterion or comprising information that said at least one fingerprint sample is to be accepted at an input interface.

38. The apparatus according to claim 37, wherein the at least one memory and the computer program
  code are configured to, with the at least one processor, cause the apparatus to visualize the at least one fingerprint sample that fulfils the inconsistency criterion on a display.

39. The apparatus according to claim 38, wherein the at least one memory and the computer program code are configured to, with the at least one processor, cause the apparatus to visualize at least one further fingerprint sample of the at least one plurality of fingerprint samples on the display.

40. The apparatus according to claim 37, wherein said signal representation comprises information on at least one selected fingerprint sample comprises information on discarding a selected plurality of fingerprint samples of the at least one plurality of fingerprint samples.

41. The apparatus according to claim 37, wherein the at least one memory and the computer program code are configured to discard the plurality of fingerprint samples in case said signal representation comprising information on at least one selected fingerprint sample further comprises information on discarding a selected plurality of fingerprint samples of the at least one plurality of fingerprint samples.

42. The apparatus according to claim 37, wherein said signal presentation comprising information on at least one selected fingerprint sample is received based on a user interaction with an input device.

43. The apparatus according to claim 23, wherein the at least one communication node comprises at least one module of the following module set:
   at least one terrestrial non-cellular transmitter;
   at least one access point of at least one wireless local area network;
   at least one Bluetooth transmitter; and
   at least one Bluetooth low energy transmitter.

44. The apparatus according to claim 23, wherein the apparatus is a unit of the following unit set:
   a chip;
   a module for a server;
   a server;
   a module for a mobile device; and
   a mobile device.

45. A system comprising an apparatus according to claim 23, wherein the apparatus is a mobile device or a server, the system further comprising one of: a server, in case the apparatus is the mobile device, and the mobile device, in case the apparatus is a server.

46. A non-transitory_computer readable storage medium in which computer program code is stored, the computer program code causing an apparatus to perform the following when executed by a processor:
   obtain at least one fingerprint sample for at least one communication node, wherein each fingerprint sample of the at least one fingerprint sample comprises results of a measurement performed by a mobile device at a particular position on a signal of a communication node of the at least one communication node including at least a signal strength related value;
   determine, for at least one fingerprint sample of the at least one fingerprint sample, whether the respective fingerprint sample fulfils an inconsistency criterion, wherein the inconsistency criterion is based on the signal strength related value of the respective fingerprint sample and a distance value indicative of an estimated distance between the mobile device and the communication node associated with the fingerprint sample; and
   determine a value related to a signal strength of a transmitted signal of the communication node associated with the respective fingerprint sample at the communication node based on:
      a maximum value of a set of one or more signal strength related values associated with the communication node; and
      an estimated value related to an altitude of the communication node,
   wherein the inconsistency criterion is further based on the value related to the signal strength of the transmitted signal of the communication node associated with the respective fingerprint sample at the communication node.

* * * * *